United States Patent
Cheng et al.

(10) Patent No.: US 9,995,975 B2
(45) Date of Patent: Jun. 12, 2018

(54) PIXEL STRUCTURE OF DISPLAY PANEL

(71) Applicant: AU OPTRONICS CORP., Hsin-Chu (TW)

(72) Inventors: Wei-Cheng Cheng, Hsin-Chu (TW); Tien-Lun Ting, Hsin-Chu (TW); Jieh-Wen Tsung, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days. days.

(21) Appl. No.: 15/620,938

(22) Filed: Jun. 13, 2017

(65) Prior Publication Data

US 2017/0285416 A1 Oct. 5, 2017

Related U.S. Application Data

(62) Division of application No. 14/708,284, filed on May 10, 2015, now Pat. No. 9,715,148.

(30) Foreign Application Priority Data

Jul. 18, 2014 (TW) .............................. 103124821 A

(51) Int. Cl.
*G02F 1/1343* (2006.01)
*G02F 1/1337* (2006.01)

(52) U.S. Cl.
CPC .. *G02F 1/134309* (2013.01); *G02F 1/133707* (2013.01); *G02F 1/133753* (2013.01); *G02F 2001/133757* (2013.01)

(58) Field of Classification Search
None
See application file for complete search history.

(56) References Cited

U.S. PATENT DOCUMENTS

2008/0297708 A1* 12/2008 Yang ................. G02F 1/133788
349/136
2011/0157537 A1* 6/2011 Chen ................. G02F 1/133707
349/158
(Continued)

FOREIGN PATENT DOCUMENTS

CN 102566170 A 7/2012

OTHER PUBLICATIONS

State Intellectual Property Office of the P.R.C., "Office Action", dated Jul. 5, 2017, China.

(Continued)

*Primary Examiner* — Ryan Crockett
(74) *Attorney, Agent, or Firm* — Tim Tingkang Xia, Esq.; Locke Lord LLP

(57) ABSTRACT

A pixel structure of display panel includes a first substrate, a second substrate, a liquid crystal layer, a first pixel electrode, a patterned insulation layer, a second pixel electrode and a common electrode. The first substrate has a plurality of alignment regions. The second substrate and the first substrate are disposed opposite to each other. The first pixel electrode is a full-surfaced electrode, which includes a plurality of branch electrodes disposed in the alignment regions. The patterned insulation layer is disposed between the first pixel electrode and the liquid crystal layer. The second pixel electrode is disposed in at least one boundary of each of the alignment regions. The common electrode is disposed on the second substrate.

5 Claims, 35 Drawing Sheets

(56) References Cited

U.S. PATENT DOCUMENTS

| | | | |
|---|---|---|---|
| 2011/0260957 A1* | 10/2011 | Jeong | G02F 1/133707 345/98 |
| 2011/0317104 A1* | 12/2011 | Nakamura | G02F 1/133371 349/106 |
| 2012/0162559 A1* | 6/2012 | Kim | G02F 1/134363 349/42 |
| 2013/0242247 A1* | 9/2013 | Lee | G02F 1/13439 349/138 |
| 2014/0111753 A1* | 4/2014 | Kobayashi | G02F 1/133753 349/123 |
| 2015/0002798 A1* | 1/2015 | Miyakawa | G02F 1/133707 349/123 |
| 2015/0049288 A1* | 2/2015 | Yeh | G02F 1/133707 349/138 |
| 2015/0177569 A1* | 6/2015 | Zhang | G02F 1/133707 349/42 |

OTHER PUBLICATIONS

State Intellectual Property Office of the P.R.C., "Search Report", China.

* cited by examiner

PIXEL STRUCTURE OF DISPLAY PANEL

CROSS-REFERENCE TO RELATED PATENT APPLICATION

This application is a divisional application of U.S. application Ser. No. 14/708,284, filed May 10, 2015, which itself claims priority to and the benefit of Taiwan Patent Application No. 103124821, filed Jul. 18, 2014. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present invention relates to a pixel structure of display panel, and more particularly, to a pixel structure of display panel with high transmittance.

BACKGROUND

Due to its advantages such as compact size and energy efficiency, liquid crystal display (LCD) panel has been widely used in various types of electronic products such as smart phone, notebook computer, tablet PC and TV. The LCD panel includes a first substrate e.g. an array substrate, a second substrate e.g. a counter substrate, and a liquid crystal layer interposed between the first substrate and the second substrate. In addition, a pixel electrode is disposed on the first substrate and a common electrode is disposed on the second substrate. Under the electric field formed by the voltage difference of the pixel electrode and the common electrode, the liquid crystal molecules can be driven to provide display function. As large size LCD panel has been developed rapidly, LCD panel is provided with wide viewing angle characteristic so as to satisfy the users' requirements. To achieve wide viewing angle function, a plurality of alignment regions are formed in each pixel and the pixel electrode includes a plurality of branch electrodes extended toward different directions such that the liquid crystal molecules in different alignment regions would tilt toward different directions when driven. During displaying, especially during displaying high grayscale images, however, the fringe field of the branch electrodes may be distorted due to the excessive fringe field effect, which causes the irregular tilted directions of the liquid crystal molecules. As a result, dark lines would appear when displaying images and the efficiency of liquid crystal is reduced. The transmittance is accordingly decreased and therefore the display quality is affected.

SUMMARY

It is therefore one of the objectives of the present invention to provide a pixel structure of display panel to increase the transmittance and avoid the generation of dark lines.

In an embodiment of the present invention, a pixel structure of display panel is provided. The pixel structure of display panel includes a first substrate, a second substrate, a liquid crystal layer, a first pixel electrode, an insulation layer, a second pixel electrode and a common electrode. The first substrate has a plurality of alignment regions and the alignment regions include a first alignment region, a second alignment region, a third alignment region and a fourth alignment region. The second substrate is disposed opposite to the first substrate. The liquid crystal layer includes a plurality of liquid crystal molecules, wherein the liquid crystal molecules are disposed between the first substrate and the second substrate, and the liquid crystal molecules located at the first alignment region, the second alignment region, the third alignment region and the fourth alignment region have different alignment directions. The first pixel electrode is disposed on the first substrate, wherein the first pixel electrode is a patterned electrode and the first pixel electrode includes a plurality of first branch electrodes disposed in the first alignment region, a plurality of second branch electrodes disposed in the second alignment region, a plurality of third branch electrodes disposed in the third alignment region, and a plurality of fourth branch electrodes disposed in the fourth alignment region. At least a portion of the first branch electrodes are substantially arranged along a first direction, at least a portion of the second branch electrodes are substantially arranged along a second direction, at least a portion of the third branch electrodes are substantially arranged along a third direction and at least a portion of the fourth branch electrodes are substantially arranged along a fourth direction, wherein the first direction, the second direction, the third direction and the fourth direction are different to one another. The first branch electrodes, the second branch electrodes, the third branch electrodes and the fourth branch electrodes are electrically connected to one another. The insulation layer is disposed on the first substrate and covers the first pixel electrode. The second pixel electrode is disposed on the insulation layer, wherein the second pixel electrode is a patterned electrode and the second pixel electrode is disposed in at least one boundary of each of the alignment regions. The common electrode is disposed on the second substrate.

In another embodiment of the present invention, a pixel structure of display panel is provided. The pixel structure of display panel includes a first substrate, a second substrate, a liquid crystal layer, a first pixel electrode, a patterned insulation layer and a common electrode. The first substrate has a plurality of alignment regions and the alignment regions includes a first alignment region, a second alignment region, a third alignment region and a fourth alignment region. The second substrate is disposed opposite to the first substrate. The liquid crystal layer includes a plurality of liquid crystal molecules, wherein the liquid crystal molecules are disposed between the first substrate and the second substrate, and the liquid crystal molecules located at the first alignment region, the second alignment region, the third alignment region and the fourth alignment region have different alignment directions. The first pixel electrode is disposed on the first substrate, wherein the first pixel electrode is a full-surfaced electrode and is disposed in the first alignment region, the second alignment region, the third alignment region and the fourth alignment region. The patterned insulation layer is disposed on the first substrate and covers the first pixel electrode. The patterned insulation layer includes a plurality of first insulation branch patterns disposed in the first alignment region, a plurality of second insulation branch patterns disposed in the second alignment region, a plurality of third insulation branch patterns disposed in the third alignment region and a plurality of fourth insulation branch patterns disposed in the fourth alignment region. At least a portion of the first insulation branch patterns substantially extends along a first direction, at least a portion of the second insulation branch patterns substantially extends along a second direction, at least a portion of the third insulation branch patterns substantially extends along a third direction and at least a portion of the fourth insulation branch patterns substantially extends along a fourth direction, wherein the first direction, the second direction, the third direction and the fourth direction are different to one another. The common electrode is disposed on the second substrate.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The foregoing and other exemplary embodiments, advantages, and features of the present disclosure will become more comprehensible by means of the detailed description of the exemplary embodiments of the present disclosure below with reference to the accompanying drawings.

DETAILED DESCRIPTION

To provide a better understanding of the present invention to the skilled users in the technology of the present invention, preferred embodiments will be detailed as follows. The preferred embodiments of the present invention are illustrated in the accompanying drawings with numbered elements to elaborate the contents and effects to be achieved.

Figure 1:
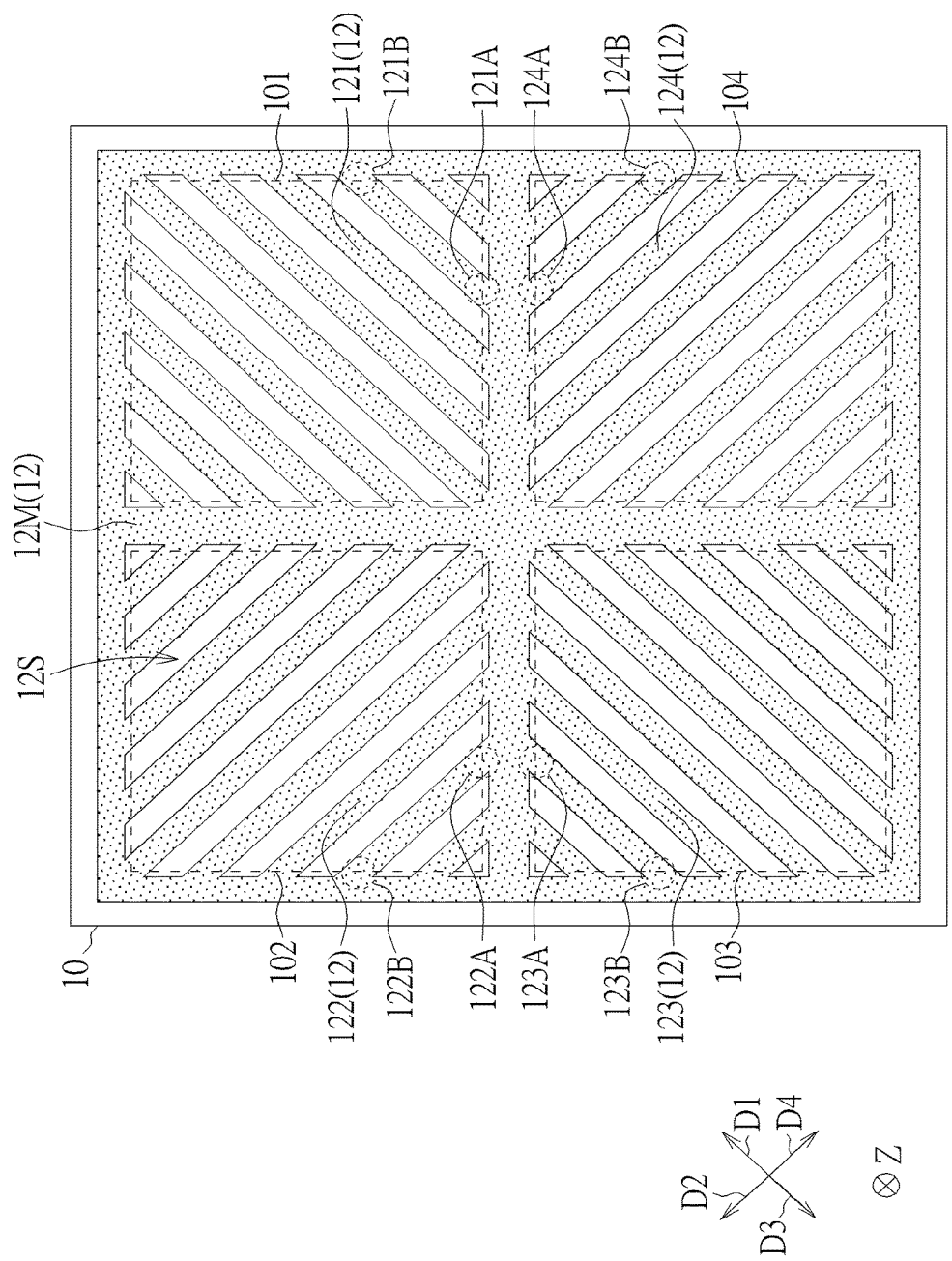
FIG. 1 is a top view schematically illustrating a first pixel electrode of a pixel structure of display panel according to a first embodiment of the present invention.
Figure 2:
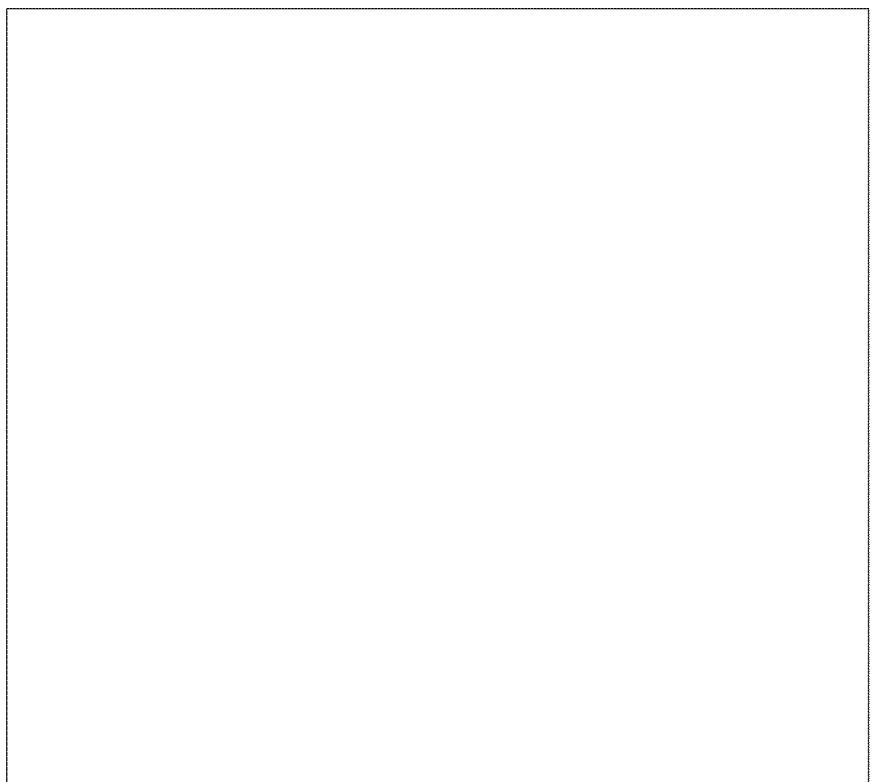
FIG. 2 is a top view schematically illustrating an insulation layer of the pixel structure of display panel according to the first embodiment of the present invention.
Figure 3:
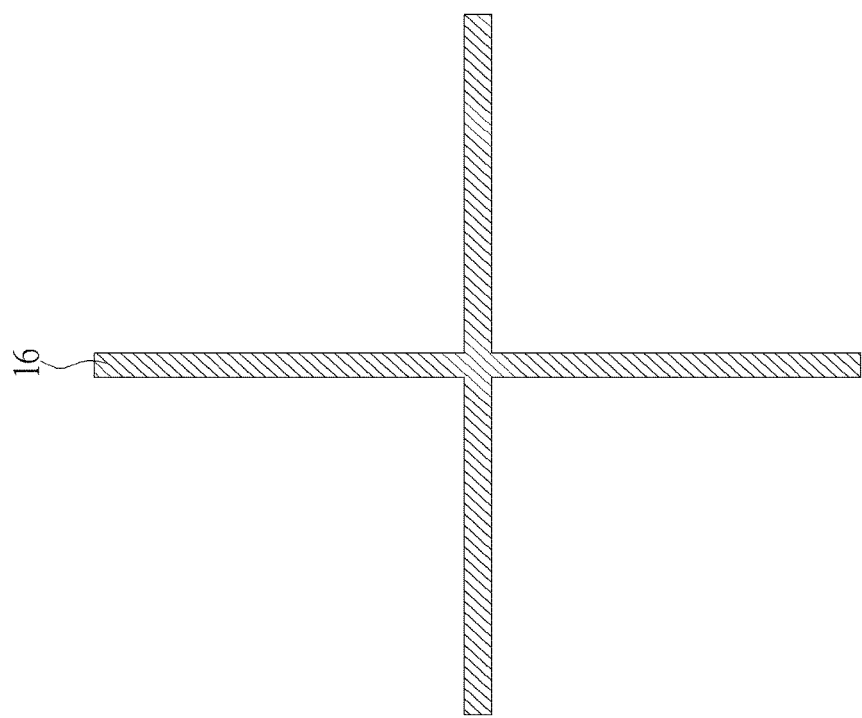
FIG. 3 is a top view schematically illustrating a second pixel electrode of the pixel structure of display panel according to the first embodiment of the present invention.
Figure 4:
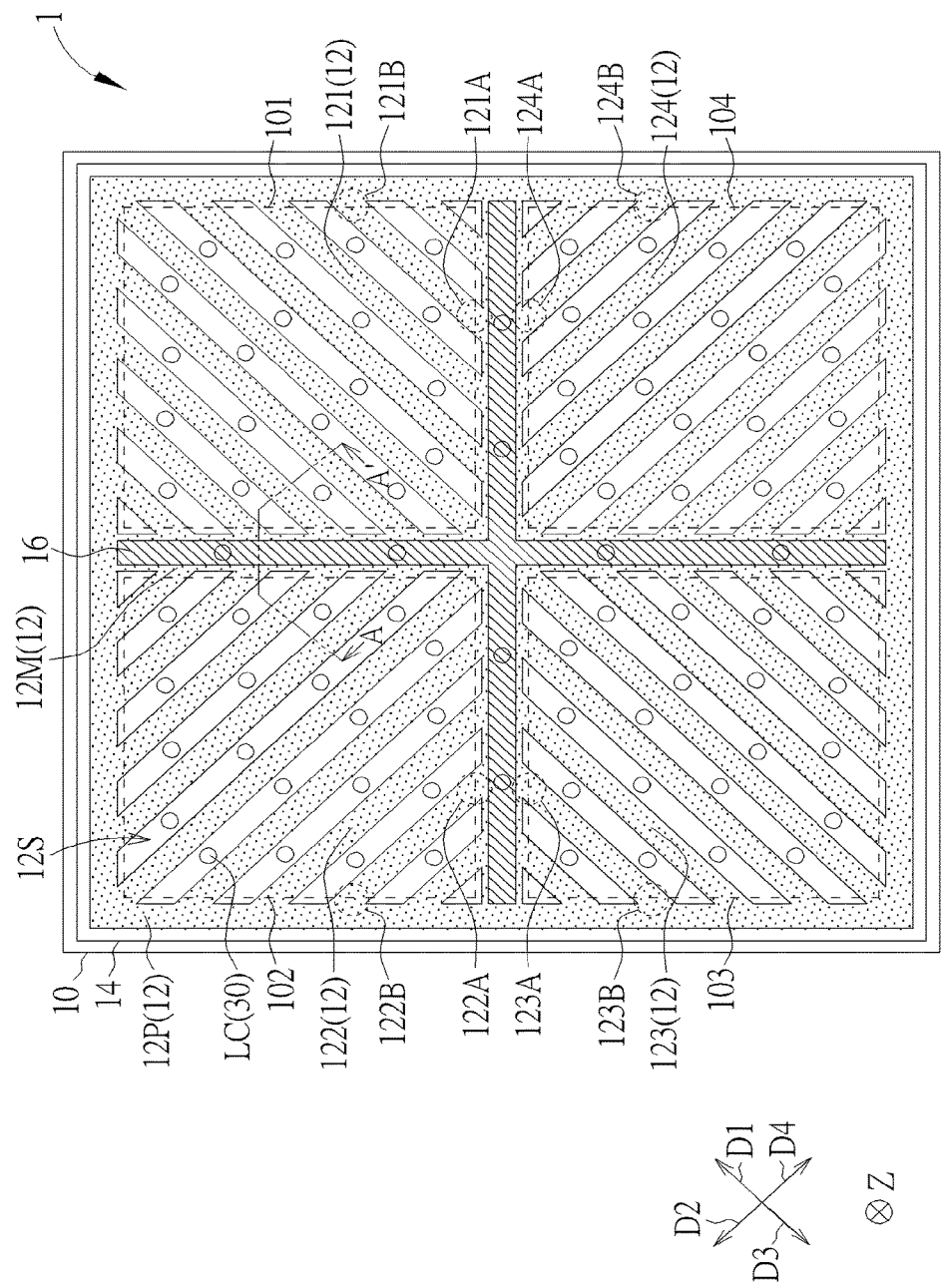
FIG. 4 is a top view schematically illustrating the pixel structure of display panel when not driven by an electric field according to the first embodiment of the present invention.
Figure 5:
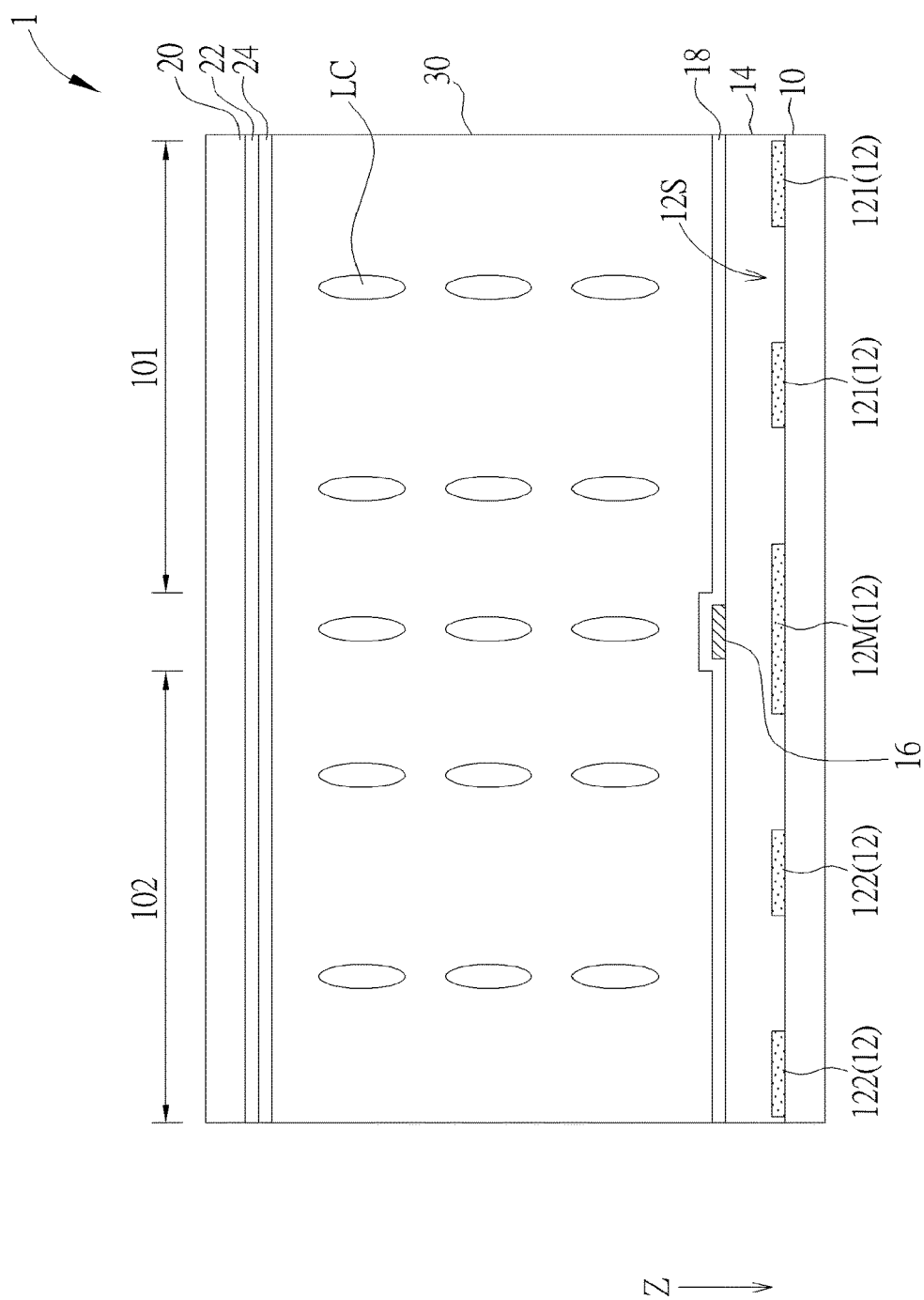
FIG. 5 is a cross-sectional view of the pixel structure of display panel taken along line A-A' of FIG. 4.

Please refer to FIGS. 1-5. FIG. 1 is a top view schematically illustrating a first pixel electrode of a pixel structure of display panel according to a first embodiment of the present invention, FIG. 2 is a top view schematically illustrating an insulation layer of the pixel structure of display panel according to the first embodiment of the present invention, FIG. 3 is a top view schematically illustrating a second pixel electrode of the pixel structure of display panel according to the first embodiment of the present invention, FIG. 4 is a top view schematically illustrating the pixel structure of display panel when not driven by an electric field according to the first embodiment of the present invention, and FIG. 5 is a cross-sectional view of the pixel structure of display panel taken along line A-A' of FIG. 4, wherein only a first substrate and layers disposed thereon are illustrated in FIG. 4, and a second substrate and layers disposed thereon, a liquid crystal layer and other components are not illustrated in FIG. 4 for highlighting the features of the pixel structure of display. As shown in FIGS. 4-5, the pixel structure 1 of display panel includes a first substrate 10, a second substrate 20, a liquid crystal layer 30, a first pixel electrode 12, an insulation layer 14, a second pixel electrode 16 and a common electrode 22. The first substrate 10 has a plurality of alignment regions. For example, the alignment regions of the present embodiment include a first alignment region 101, a second alignment region 102, a third alignment region 103 and a fourth alignment region 104, but not limited thereto. For instance, the number of alignment regions may be modified. In addition, the shape and the size of the first alignment region 101, the second alignment region 102, the third alignment region 103 and the fourth alignment region 104 of the present embodiment are substantially the same, but not limited thereto. For example, the alignment regions may have different sizes or different shapes. The second substrate 20 is disposed opposite to the first substrate 10. The first substrate 10 and the second substrate 20 may respectively be a transparent substrate e.g. a glass substrate, a quartz substrate, a plastic substrate or another suitable rigid or flexible substrate. In the present embodiment, the first substrate 10 is an array substrate (or known as a thin-film transistor substrate), and switching units such as thin-film transistor units, conducting lines e.g. gate lines, data lines and common lines, color filters, storage capacitors, or other essential units may be disposed on the first substrate 10. The positions and the functions of the above mentioned units are known to the skilled person in the art and will not be redundantly described. In addition, the second substrate 20 is a counter substrate. Light-shielding patterns such as a black matrix, a color filter or other essential units may be disposed on the second substrate 20. The positions and the functions of the above mentioned units are known to the skilled person in the art and will not be redundantly described. The liquid crystal layer 30 includes a plurality of liquid crystal molecules LC, wherein the liquid crystal molecules LC are disposed between the first substrate 10 and the second substrate 20, and the liquid crystal molecules LC located at the first alignment region 101, the second alignment region 102, the third alignment region 103 and the fourth alignment region 104 have different alignment directions. The liquid crystal molecules LC may be vertical alignment (VA) liquid crystal molecules and may be negative typed liquid crystal molecules, but not limited thereto. As shown in FIG. 1, FIG. 4 and FIG. 5, the first pixel electrode 12 is disposed on the first substrate 10. The first pixel electrode 12 of the present embodiment is a transparent electrode and may be made of transparent conductive materials such as indium tin oxide (ITO), indium zinc oxide (IZO), or other suitable transparent conductive materials, but not limited thereto. In other alternative embodiments of the present invention, the first pixel electrode 12 may be a non-transparent electrode and may be made of non-transparent conductive materials such as metal. In addition, the first pixel electrode 12 may be a single-layered structure or a stacked multi-layered structure. The first pixel electrode 12 is a patterned electrode and the first pixel electrode 12 includes a plurality of first branch electrodes 121 disposed in the first alignment region 101, a plurality of second branch electrodes 122 disposed in the second alignment region 102, a plurality of third branch electrodes 123 disposed in the third alignment region 103, and a plurality of fourth branch electrodes 124 disposed in the fourth alignment region 104, wherein the first branch electrodes 121, the second branch electrodes 122, the third branch electrodes 123 and the fourth branch electrodes 124 are electrically connected to one another. Furthermore, at least a portion of the first branch electrodes 121 are substantially arranged along a first direction D1, at least a portion of the second branch electrodes 122 are substantially arranged along a second direction D2, at least a portion of the third branch electrodes 123 are substantially arranged along a third direction D3 and at least a portion of the fourth branch electrodes 124 are substantially arranged along a fourth direction D4, wherein the first direction D1, the second direction D2, the third direction D3 and the fourth direction D4 are different to one another. Additionally, there are slits 12S between any two adjacent (adjoining) branch electrodes. The insulation layer 14 is disposed on the first substrate 10 and covers the first pixel electrode 12. As shown in FIG. 2 and FIG. 4, the insulation layer 14 of the present embodiment is a full-surfaced insulation layer. In other words, the insulation layer 14 substantially completely covers the first alignment region 101, the second alignment region 102, the third alignment region 103, the fourth alignment region 104 and the first pixel electrode 12, but not limited thereto. As shown in FIGS. 3-5, the second pixel electrode 16 is disposed on the insulation layer 14, wherein the second pixel electrode 16 is a patterned electrode and the second pixel electrode 16 is disposed in at least one boundary of each of the alignment regions. More specifically, the second pixel electrode 16 is disposed in the common boundary of any two adjoining alignment regions of the alignment regions. In other words, the second pixel electrode 16 is disposed between the first alignment region 101 and the second alignment region 102, the second alignment region 102 and the third alignment region 103, the third alignment region 103 and the fourth alignment region 104, and the fourth alignment region 104 and the first alignment region 101. The second pixel electrode 16 of the present embodiment is a transparent electrode and may be made of transparent conductive materials such as indium tin oxide (ITO), indium zinc oxide (IZO), or other suitable transparent conductive materials, but not limited thereto. In other alternative embodiments of the present invention, the second pixel electrode 16 may be a non-transparent electrode and may be made of non-transparent conductive materials such as metal. In addition, the second pixel electrode 16 may be a single-layered structure or a stacked multi-layered structure. The common electrode 22 is disposed on the second substrate 20. The common electrode 22 of the present embodiment is a transparent electrode and may be made of transparent conductive materials such as indium tin oxide (ITO), indium zinc oxide (IZO), or other suitable transparent conductive materials, but not limited thereto. In addition, the common electrode 22 of the present embodiment is a full-surfaced electrode, in other words, the common electrode 22 substantially completely covers the first alignment region 101, the second alignment region 102, the third alignment region 103 and the fourth alignment region 104 without any slits or openings, but not limited thereto. As shown in FIG. 5, the pixel structure 1 of display panel further includes a first alignment film 18 and a second alignment film 24. The first alignment film 18 is disposed on the first substrate 10 and covers the insulation layer 14 and the second pixel electrode 16. The second alignment film 24 is disposed on the second substrate 20 and covers the common electrode 22. In other words, the first alignment film 18 and the second alignment film 24 are disposed on two opposite sides of the liquid crystal layer 30 for aligning the liquid crystal molecules LC. In the present embodiment, the first alignment film 18 and the second alignment film 24 may be made through polymer stabilized alignment (PSA) technique, but not limited thereto. For instance, the first alignment film 18 may include a first polymer auxiliary alignment layer and the second alignment film 24 may include a second polymer auxiliary alignment layer, but not limited thereto. In the present embodiment, the first pixel electrode 12 further includes a main part 12M. The main part 12M of the first pixel electrode 12 is disposed in a common boundary of any two adjoining alignment regions of the alignment regions, in other words, the main part 12M of the first pixel electrode 12 is disposed in a common boundary of any two adjacent alignment regions. In other words, the main part 12M is disposed between the first alignment region 101 and the second alignment region 102, the second alignment region 102 and the third alignment region 103, the third alignment region 103 and the fourth alignment region 104, and the fourth alignment region 104 and the first alignment region 101. In addition, the main part 12M of the first pixel electrode 12 is respectively connected to a first end 121A of each of the first branch electrodes 121, a first end 122A of each of the second branch electrodes 122, a first end 123A of each of the third branch electrodes 123 and a first end 124A of each of the fourth branch electrodes 124. The main part 12M of the first pixel electrode 12 substantially overlaps the second pixel electrode 16 in a vertical projection direction Z. For instance, the main part 12M of the first pixel electrode 12 and the second pixel electrode 16 substantially respectively include a cruciform (cross-shaped) electrode and the width of the main part 12M of the first pixel electrode 12 is larger than the width of the second pixel electrode 16, but not limited thereto. When viewed from the direction of the vertical projection direction Z, the main part 12M of the first pixel electrode 12 divides the first substrate 10 into four quadrants. The first alignment region 101, the second alignment region 102, the third alignment region 103 and the fourth alignment region 104 are respectively disposed in the first quadrant, the second quadrant, the third quadrant and the fourth quadrant. In the present embodiment, the first branch electrodes 121 are substantially arranged and extended along the first direction D1, the second branch electrodes 122 are substantially arranged and extended along the second direction D2, the third branch electrodes 123 are substantially arranged and extended along the third direction D3, and the fourth branch electrodes 124 are substantially arranged and extended along the fourth direction D4. In addition, the first direction D1 is substantially perpendicular to the second direction D2, the second direction D2 is substantially perpendicular to the third direction D3, the third direction D3 is substantially perpendicular to the fourth direction D4 and the fourth direction D4 is substantially perpendicular to the first direction D1. For example, if the azimuth angle in the horizontal direction measured counterclockwise from a referent direction, as from the right direction, in FIG. 1 is defined as 0 degree and the counterclockwise direction is defined as forward direction, then the first direction D1 is substantially 45 degrees, the second direction D2 is substantially 135 degrees, the third direction D3 is substantially 225 degrees and the fourth direction D4 is substantially 315 degrees, but not limited thereto. In an alternative embodiment, the first direction D1, the second direction D2, the third direction D3 and the fourth direction D4 may not be perpendicular to one another. For instance, the included angle of the first direction D1 and the fourth direction D4 may be 80 degrees and the included angle of the second direction D2 and the third direction D3 may be 80 degrees. In addition, the first pixel electrode 12 may further include an outer frame part 12P. The outer frame part 12P surrounds the first alignment region 101, the second alignment region 102, the third alignment region 103 and the fourth alignment region 104. The outer frame part 12P is connected to the first branch electrodes 121, the second branch electrodes 122, the third branch electrodes 123 and the fourth branch electrodes 124. For example, the outer frame part 12P is respectively connected to a second end 121B of each of the first branch electrodes 121, a second end 122B of each of the second branch electrodes 122, a second end 123B of each of the third branch electrodes 123 and a second end 124B of each of the fourth branch electrodes 124.

Figure 6:
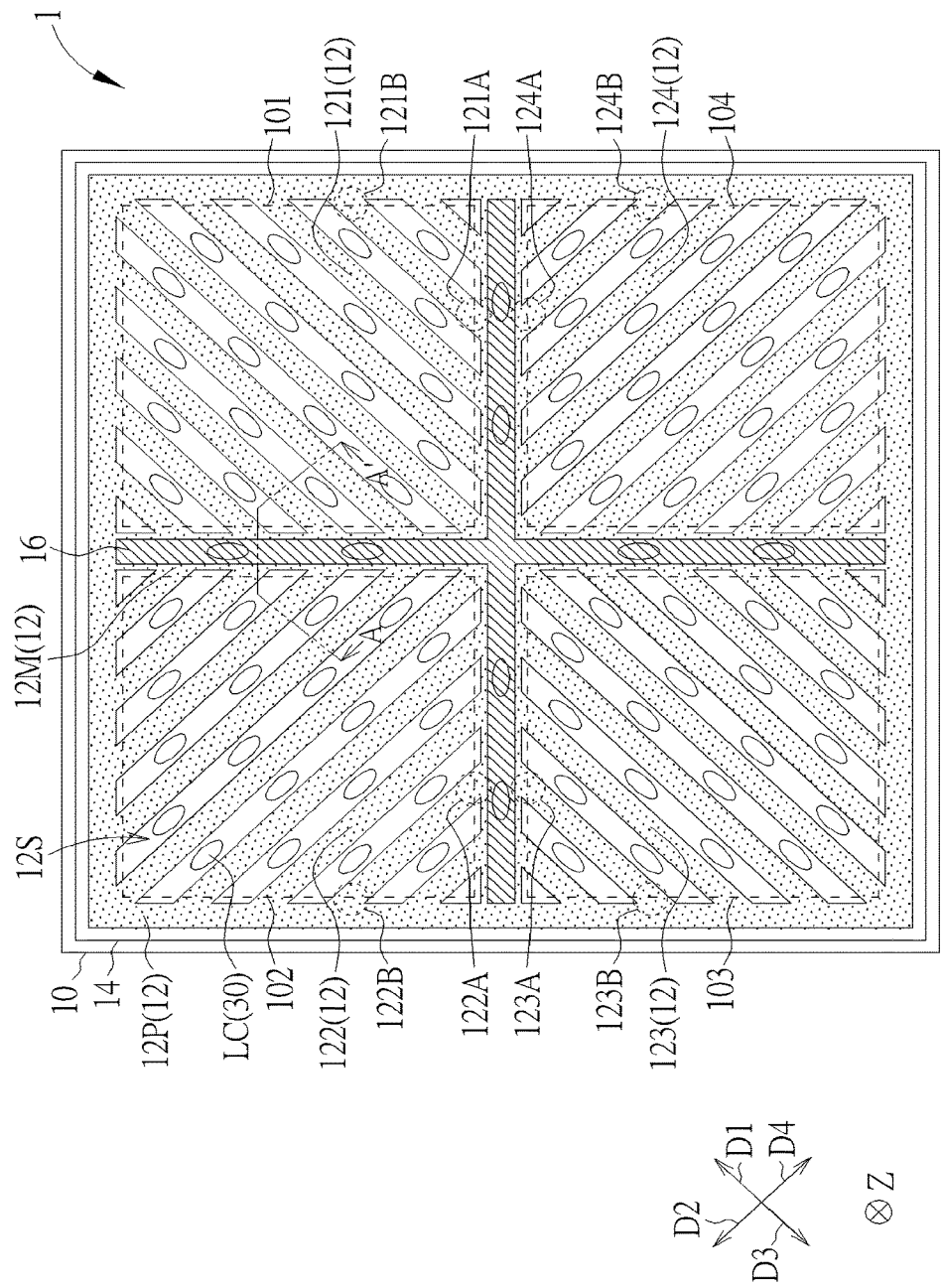
FIG. 6 is a top view schematically illustrating the pixel structure of display panel when driven by the electric field according to the first embodiment of the present invention.
Figure 7:
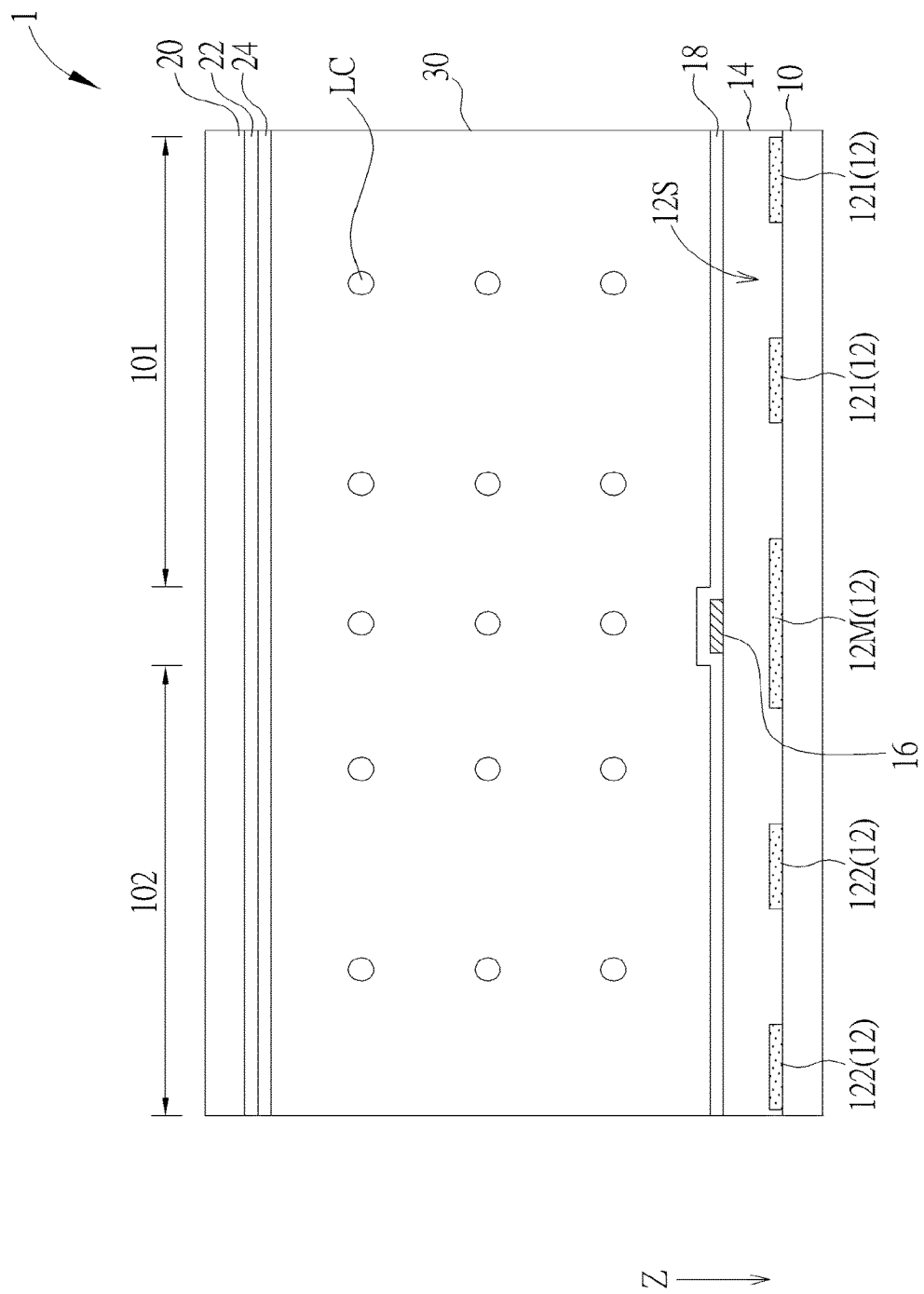
FIG. 7 is a cross-sectional view of the pixel structure of display panel taken along line A-A' of FIG. 6.

The driving method of the pixel structure of display panel of the present embodiment is elaborated as follows. As shown in FIGS. 4-5, when not driven by the electric field, the liquid crystal molecules LC located at the first alignment region 101, the second alignment region 102, the third alignment region 103 and the fourth alignment region 104 substantially stand vertically and pre tilt toward the third direction D3, the fourth direction D4, the first direction D1 and the second direction D2 respectively, i.e. the liquid crystal molecules LC pre tilt toward the intersection part of the main part 12M of the first pixel electrode 12. Please refer to FIGS. 6-7. FIG. 6 is a top view schematically illustrating the pixel structure of display panel when driven by an electric field according to the first embodiment of the present invention. FIG. 7 is a cross-sectional view of the pixel structure of display panel taken along line A-A' of FIG. 6. As shown in FIGS. 6-7, in the present embodiment, the first pixel electrode 12 is electrically connected to the drain electrode of the switching unit (not shown in the figure) so as to have a first driving voltage (e.g. pixel voltage), and the common electrode 22 is electrically connected to the common line (not shown in the figure) so as to have a common voltage. In addition, the second pixel electrode 16 may be electrically connected to the first pixel electrode 12 and also have the first driving voltage (e.g. pixel voltage). When the liquid crystal molecules LC are driven by the electric field between the first pixel electrode 12 and the common electrode 22 and the electric field between the second pixel electrode 16 and the common electrode 22, the liquid crystal molecules LC located at the first alignment region 101, the second alignment region 102, the third alignment region 103 and the fourth alignment region 104 would tilt and have different alignment direction. For instance, the liquid crystal molecules LC located at the first alignment region 101, the second alignment region 102, the third alignment region 103 and the fourth alignment region 104 would respectively tilt toward the third direction D3, the fourth direction D4, the first direction D1 and the second direction D2 respectively, i.e. the liquid crystal molecules LC tilt toward the intersection part of the main part 12M of the first pixel electrode 12. Due to the electric field distortions generated by the excessive fringe field effect of the edges of the main part 12M of the first pixel electrode 12 and the edges of the branch electrodes, the insulation layer 14 disposed between the first pixel electrode 12 and the liquid crystal layer 30 is able to provide an isolation effect. The impact of liquid crystal molecules LC influenced by the fringe field are accordingly decreased, and therefore the liquid crystal molecules LC corresponding to the edges of the main part 12M of the first pixel electrode 12 and the edges of the branch electrodes only experience slight electric field distortions. As a result, the liquid crystal molecules LC under high voltage operations would not be deviated from the direction of the alignment regions as not being influenced by excessive electric field distortions and the transmittance is therefore improved. Furthermore, small and regular variations of equipotential surface may be provided by the second pixel electrode 16, which can substitute for the fringe field of the main part 12M of the first pixel electrode 12 and drive the liquid crystal molecules LC, and therefore may reduce the width of the dark line of the common boundaries (common borders) of the alignment regions. The transmittance may be accordingly improved. By applying the driving method mentioned above, the irregular arrangement of the liquid crystal molecules LC may be solved and the generation of the dark lines is avoided. It is worth noting that, in other alternative embodiments, the second pixel electrode 16 may not be electrically connected to the first pixel electrodes 12 and may have a different driving voltage or the same first driving voltage (e.g. pixel voltage) as the first pixel electrode 12. For instance, the second pixel electrode 16 may have a second driving voltage, and the second driving voltage is higher than the first driving voltage, but not limited thereto. In addition, the second driving voltage may be provided with a constant voltage source, in other words, the second pixel electrode 16 of each pixel structure has the same second driving voltage. Alternatively, the second pixel electrodes 16 of each pixel structure may be controlled by a corresponding switching unit (e.g. thin-film transistor unit) such that the second pixel electrode 16 of each pixel structure has a different second driving voltage.

Figure 8:
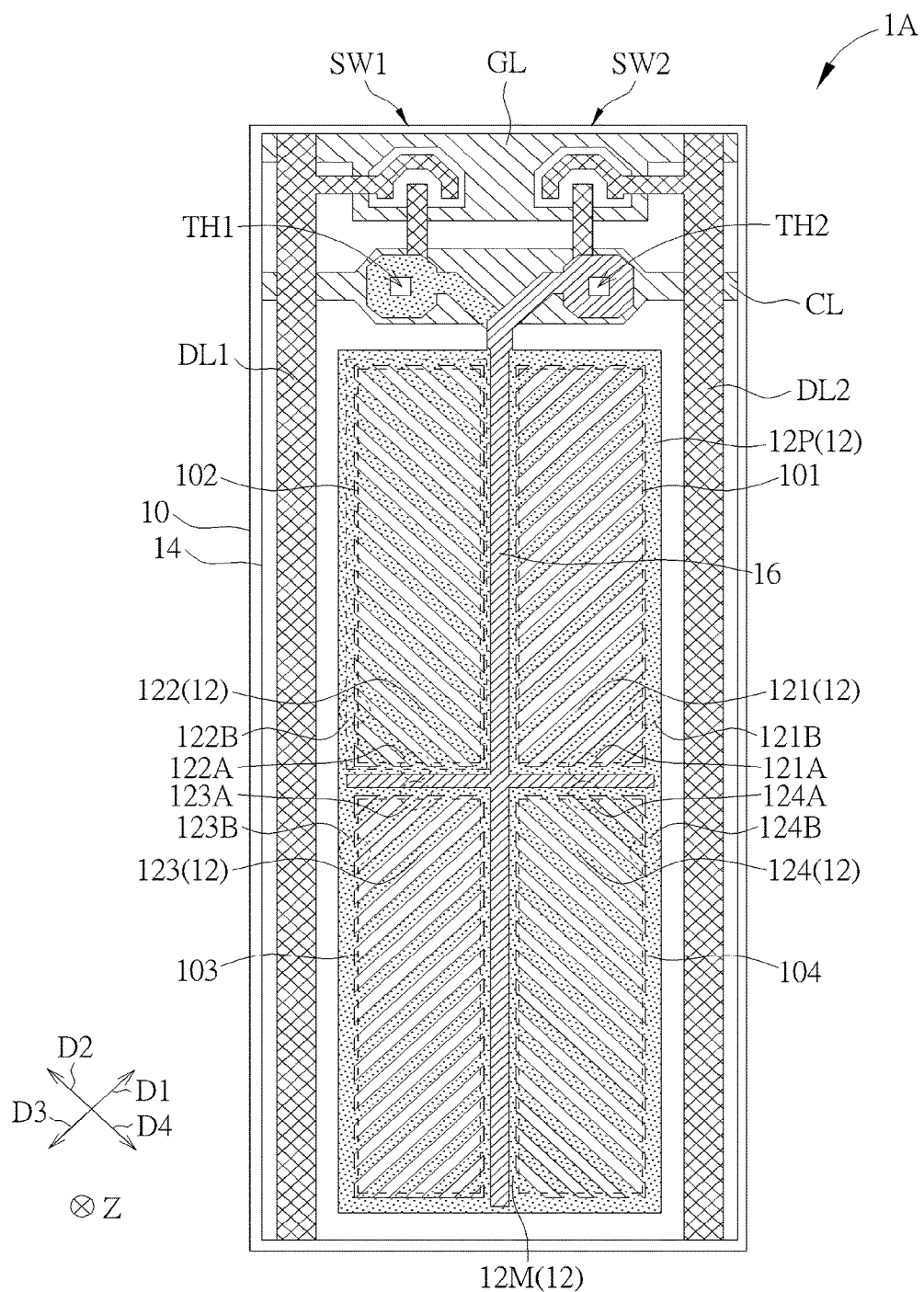
FIG. 8 is a schematic diagram illustrating a pixel structure of display panel according to a first configuration of the first embodiment of the present invention.

Please refer to FIG. 8 in view of FIGS. 1-7. FIG. 8 is a schematic diagram illustrating a pixel structure of display panel according to a first configuration of the first embodiment of the present invention. As shown in FIG. 8, the pixel structure 1A of display panel includes a first switching unit SW1 and a second switching unit SW2, where the first pixel electrode 12 is electrically connected to the drain electrode of the first switching unit SW1 via a first through hole TH1, and the second pixel electrode 16 is electrically connected to the drain electrode of the second switching unit SW2 via a second through hole TH2. The first through hole TH1 and the second through hole TH2 are located outside the active region (effective display region), and thus the aperture ratio is unaffected. In this configuration, the first switching unit SW1 and the second switching unit SW2 share the same gate line GL but connect to a first data line DL1 and a second data line DL2 respectively. Specifically, the gate electrodes of the first switching unit SW1 and the second switching unit SW2 are electrically connected to the same gate line GL, while the source electrodes of the first switching unit SW1 and the second switching unit SW2 are electrically connected to the first data line DL1 and the second data line DL2 respectively. In addition, the pixel structure 1A of display panel may further include a common line CL, which partially overlaps the first pixel electrode 12 and the second pixel electrode 16 to form storage capacitors respectively. By virtue of the above configuration, the first pixel electrode 12 and the second pixel electrode 16 may be driven independently, i.e. the first pixel electrode 12 may be provided with a first driving voltage and the second pixel electrode 16 may be provided with a second driving voltage. In alternative configurations, the first switching unit SW1 and the second switching unit SW2 may share the same data line but connect to different gate lines, or the first switching unit SW1 and the second switching unit SW2 may connect to different gate lines and different data lines.

Figure 9:
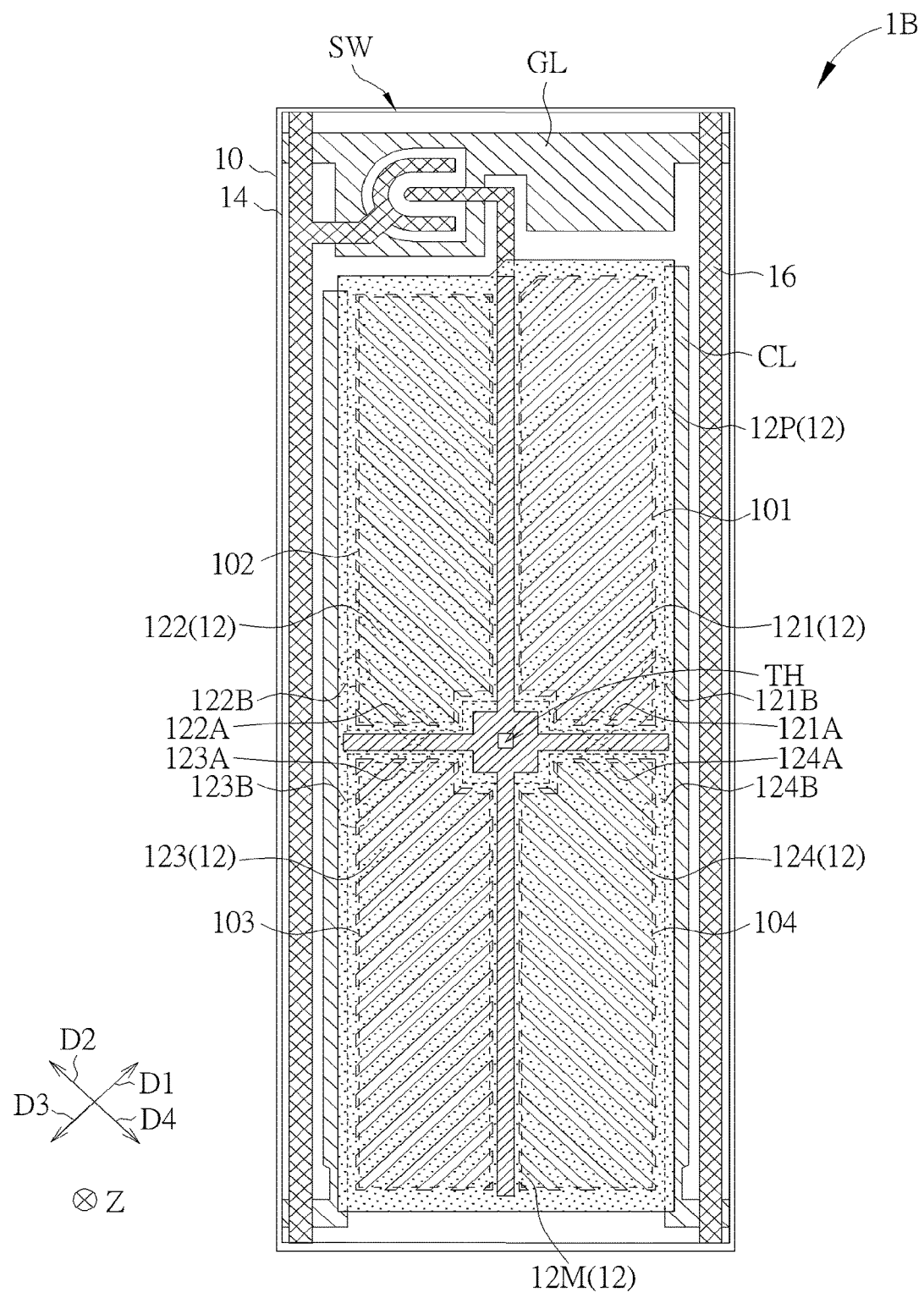
FIG. 9 is a schematic diagram illustrating a pixel structure of display panel according to a second configuration of the first embodiment of the present invention.

Please refer to FIG. 9 in view of FIGS. 1-7. FIG. 9 is a schematic diagram illustrating a pixel structure of display panel according to a second configuration of the first embodiment of the present invention. As shown in FIG. 9, the pixel structure 1B of display panel includes a switching unit SW, a gate line GL, a data line DL and a common line CL. The first pixel electrode 12 is electrically connected to the drain electrode of the switching unit SW via a through hole TH. The drain electrode of the switching unit SW may extend to the active region and partially overlap the common line CL. The through hole TH may be located in the overlapping region of the drain electrode and the common line CL, and thus the aperture ratio is unaffected. In this configuration, the first pixel electrode 12 is provided with a first driving voltage by the switching unit SW, and the second pixel electrode 16 is electrically connected to the first pixel electrode 12, thereby having the first driving voltage as well.

Figure 10:
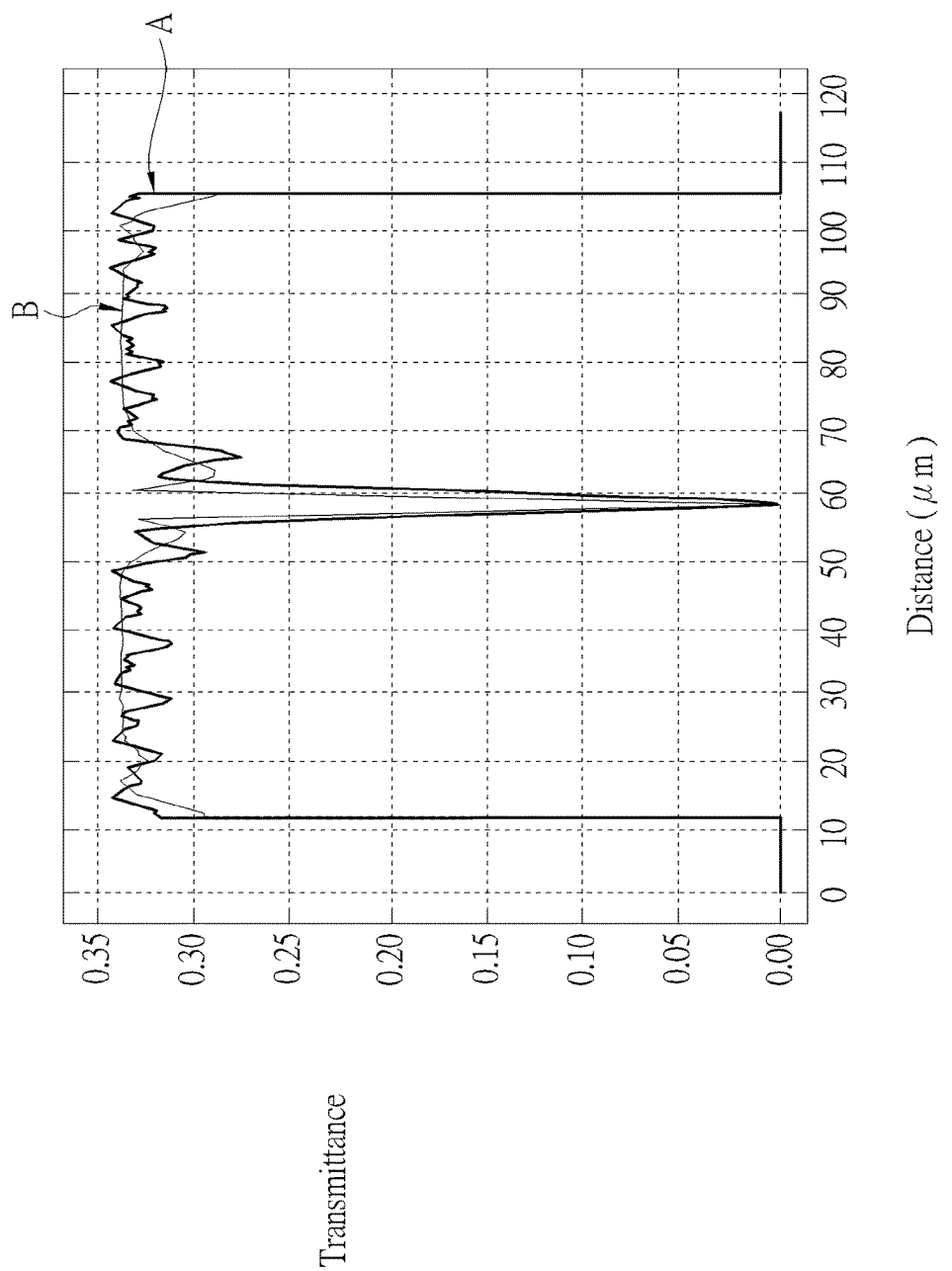
FIG. 10 is a diagram illustrating the distribution of transmittance of the pixel structure of display panel according to the present embodiment and a comparative embodiment.

Please refer to FIG. 10. FIG. 10 is a diagram illustrating the distribution of transmittance of the pixel structure of display panel according to the present embodiment and a comparative embodiment, wherein only the first pixel electrode is disposed in the pixel structure of display panel of the comparative embodiment without disposing the insulation layer and the second pixel electrode. The curved line A illustrates the transmittance distribution of the pixel structure of display panel according to the comparative embodiment and the curved line B illustrates the transmittance distribution of the pixel structure of display panel according to the present embodiment. The X axis represents the distance in the horizontal direction of the pixel structure of display panel (unit: μm (micrometer)) and the Y axis represents the transmittance (no unit). As shown in FIG. 10, the curved line A shows the transmittance distributed in apparent alternating high and low fluctuations, which means the pixel structure of display panel of the comparative embodiment suffered from serious dark line problems. The curved line B shows more smooth and continuous transmittance distribution, which is a proof of the pixel structure of display panel according to the present embodiment addressing the problem of electric field distortion and effectively eliminating the dark line problems.

Figure 11:
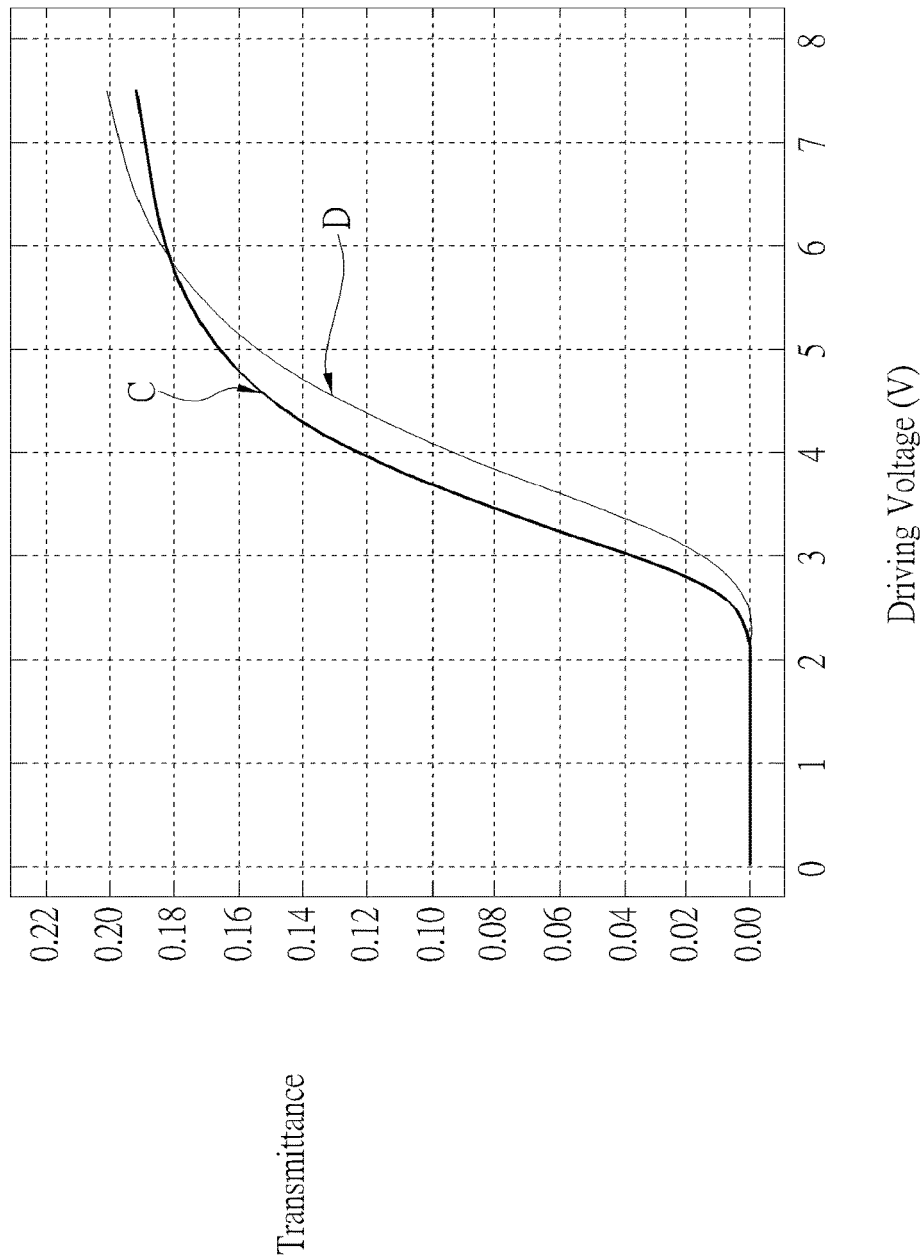
FIG. 11 is a diagram illustrating the relation between the transmittance and a driving voltage of the pixel structure of display panel according to the present embodiment and a comparative embodiment.

Please refer to FIG. 11. FIG. 11 is a diagram illustrating the relation between the transmittance and a driving voltage of the pixel structure of display panel according to the present embodiment and a comparative embodiment, wherein only the first pixel electrode is disposed in the pixel structure of display panel of the comparative embodiment without disposing the insulation layer and the second pixel electrode. The curved line C illustrates the relationship diagram of the transmittance and the driving voltage of the pixel structure of display panel according to the comparative embodiment and the curved line D illustrates the relationship diagram of the transmittance and the driving voltage of the transmittance of the pixel structure of display panel according to the present embodiment. The X axis represents the driving voltage (unit: V) and the Y axis represents the transmittance. As shown in FIG. 11, when the driving voltage is higher than 6 volts, the transmittance of the curved line D is higher than the transmittance of the curved line C, which is a proof of the pixel structure of display panel according to the present embodiment addressing the problem of electric field distortion under high grayscale operations and effectively increasing the transmittance.

The pixel structure of display panel is not limited by the aforementioned embodiment, and may have other different preferred embodiments. To simplify the description, the identical components in each of the following embodiments are marked with identical symbols. For making it easier to compare the difference between the embodiments, the following description will detail the dissimilarities among different embodiments and the identical features will not be redundantly described.

Figure 12:
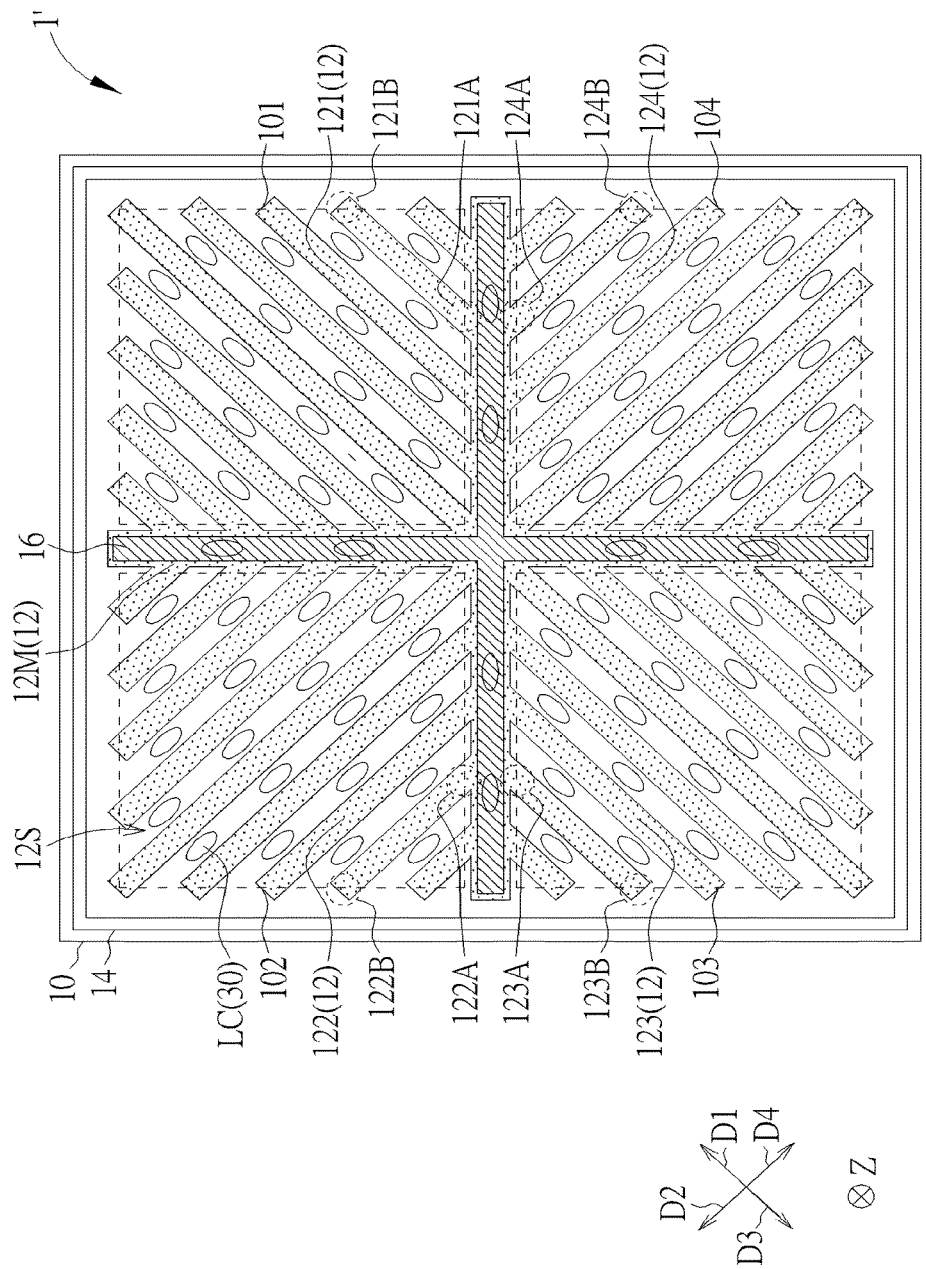
FIG. 12 is a top view schematically illustrating the pixel structure of display panel according to an alternative embodiment of the first embodiment of the present invention.

Please refer to FIG. 12. FIG. 12 is a top view schematically illustrating the pixel structure of display panel according to an alternative embodiment of the first embodiment of the present invention. As shown in FIG. 12, the pixel structure 1' of display panel of the alternative embodiment is similar to the first embodiment except for the pattern of the first pixel electrode 12. Specifically, the first pixel electrode 12 of this alternative embodiment includes the main part 12M, the branch electrodes e.g. the first branch electrodes 121, the second branch electrodes 122, the third branch electrodes 123 and the fourth branch electrodes 124 and slits 12S between any two adjacent branch electrodes, but excludes the outer frame part. Without the outer frame part, the pixel structure 1' of display panel is also able to modify the electric field distortion, effectively eliminate the dark line problems, and increase the transmittance.

Figure 13:
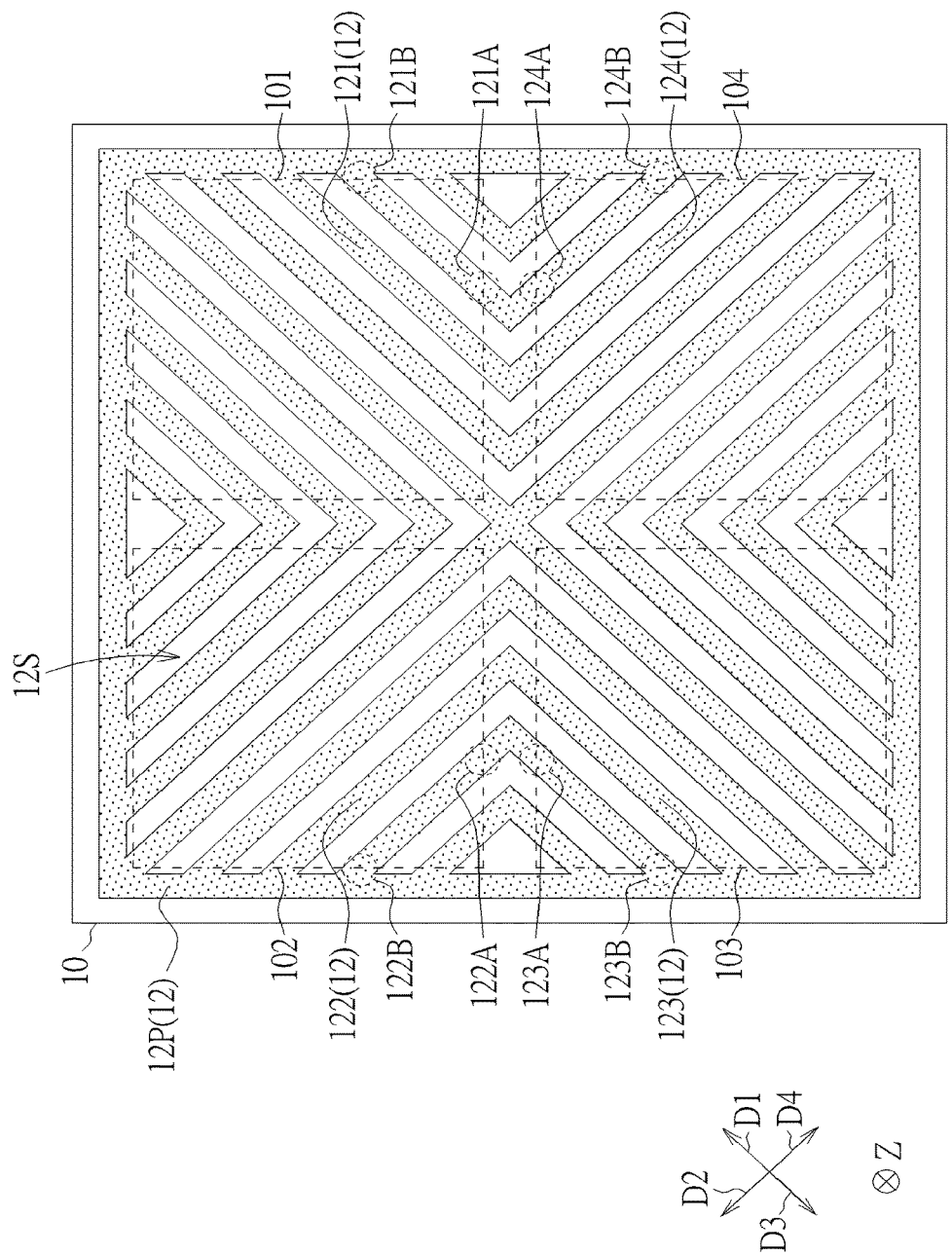
FIG. 13 is a top view schematically illustrating a first pixel electrode of a pixel structure of display panel according to a second embodiment of the present invention.
Figure 14:
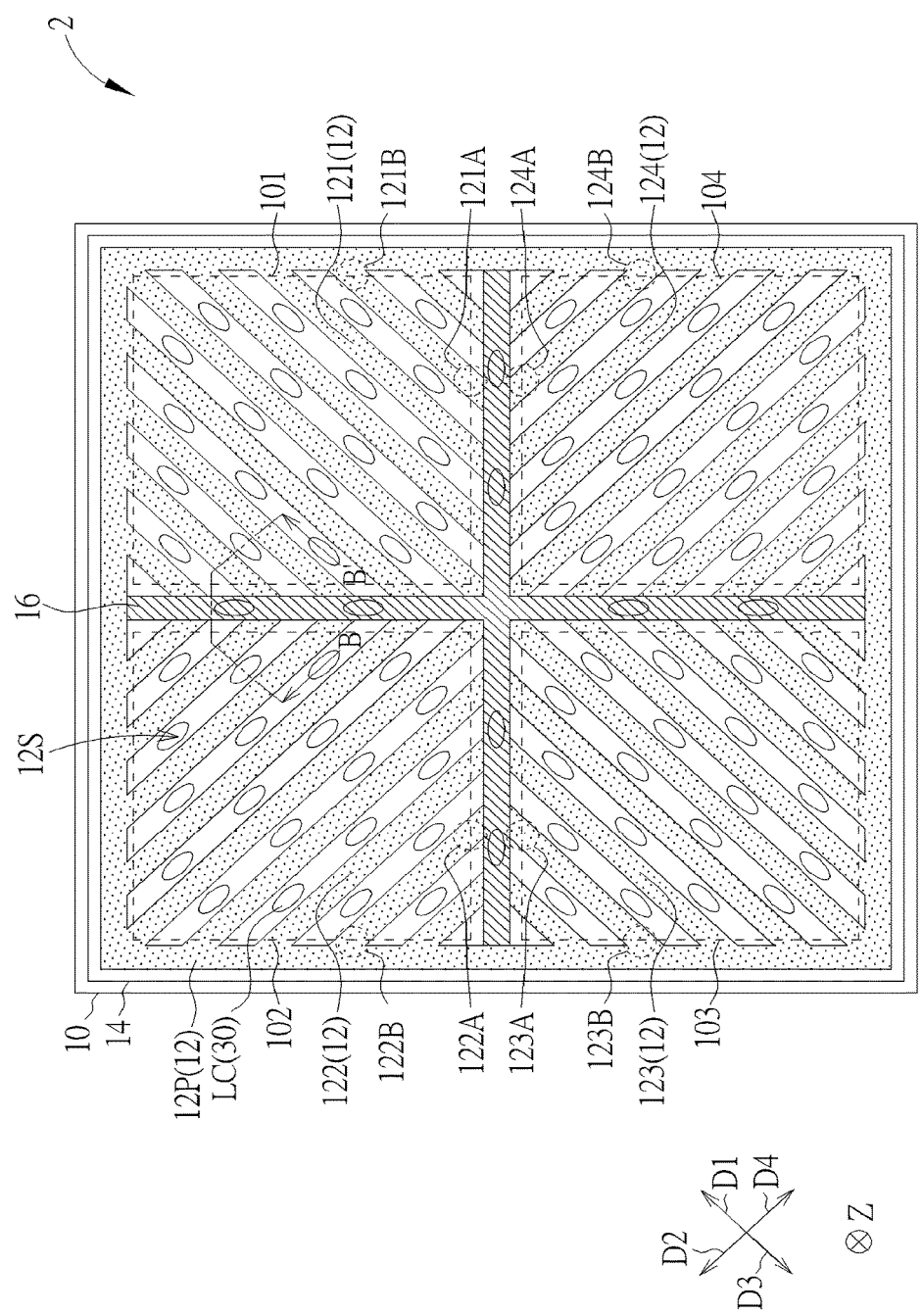
FIG. 14 is a top view schematically illustrating the pixel structure of display panel according to the second embodiment of the present invention.
Figure 15:
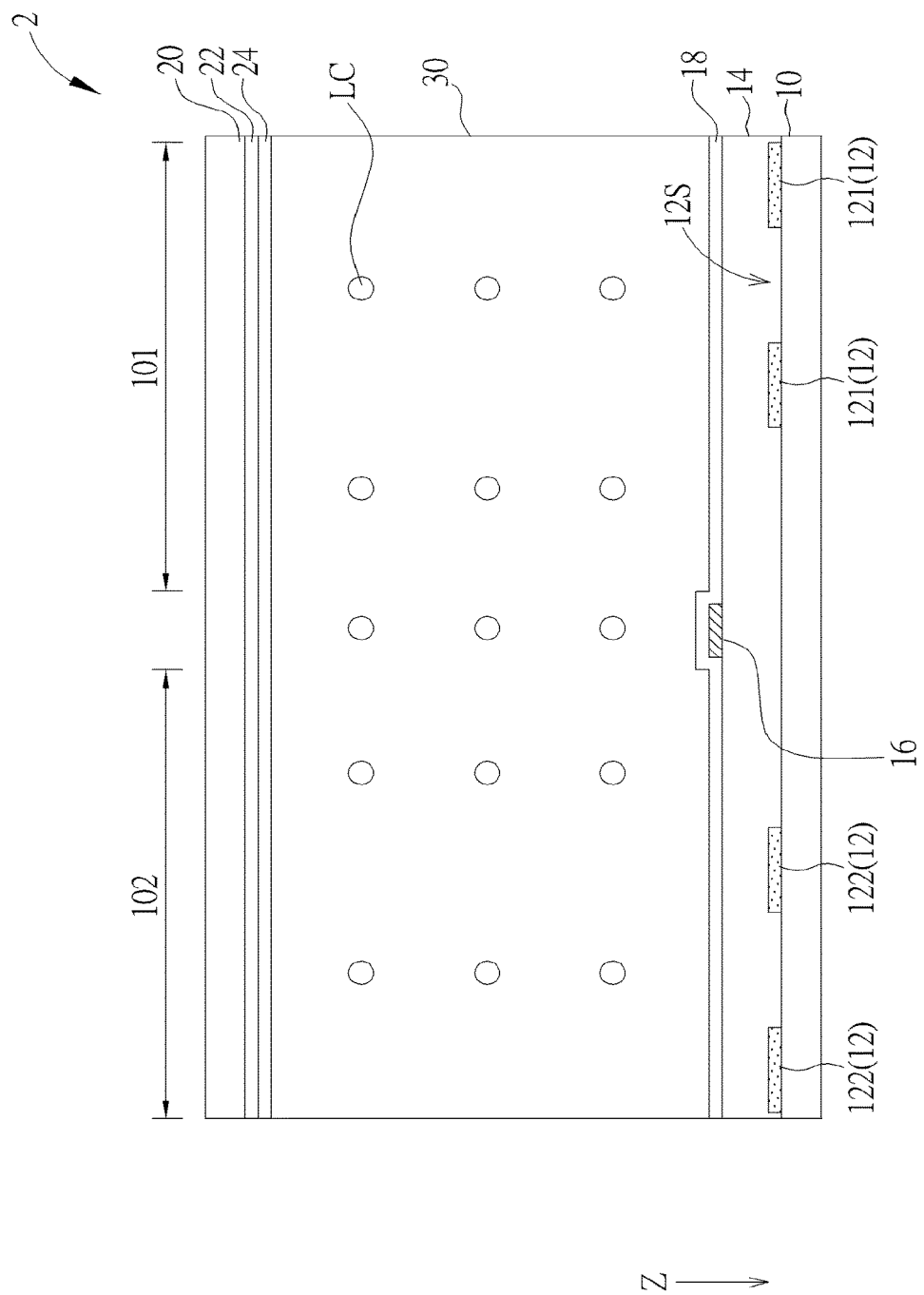
FIG. 15 is a cross-sectional view of the pixel structure of display panel taken along line B-B' of FIG. 14.

Please refer to FIGS. 13-15. FIG. 13 is a top view schematically illustrating a first pixel electrode of a pixel structure of display panel according to a second embodiment of the present invention. FIG. 14 is a top view schematically illustrating the pixel structure of display panel according to the second embodiment of the present invention. FIG. 15 is a cross-sectional view of the pixel structure of display panel taken along line B-B' of FIG. 14. As shown in FIGS. 13-15, the difference between the present embodiment and the first embodiment is that the first pixel electrode 12 of the pixel structure 2 of display panel does not include the main part and each of branch electrodes is connected to another corresponding branch electrode. More specifically, a first end 121A of a portion of the first branch electrodes 121 is connected to a first end 122A of a portion of the second branch electrodes 122, a first end 121A of the other portion of the first branch electrodes 121 is connected to a first end 124A of a portion of the fourth branch electrodes 124; a first end 122A of a portion of the second branch electrodes 122 is connected to a first end 121A of a portion of the first branch electrodes 121, a first end 122A of the other portion of the second branch electrodes 122 is connected to a first end 123A of a portion of the third branch electrodes 123; a first end 123A of a portion of the third branch electrodes 123 is connected to a first end 122A of a portion of the second branch electrodes 122, a first end 123A of the other portion of the third branch electrodes 123 is connected to a first end 124A of a portion of the fourth branch electrodes 124; a first end 124A of a portion of the fourth branch electrodes 124 is connected to a first end 123A of a portion of the third branch electrodes 123, and a first end 124A of the other portion of the fourth branch electrodes 124 is connected to a first end 121A of a portion of the first branch electrodes 121. In addition, the second pixel electrode 16 substantially includes a cruciform electrode and the second pixel electrode 16 substantially overlaps the first ends 121A of the first branch electrodes 121, the first ends 122A of the second branch electrodes 122, the first ends 123A of the third branch electrodes 123 and the first ends 124A of the fourth branch electrodes 124 in the vertical projection direction Z.

Figure 16:
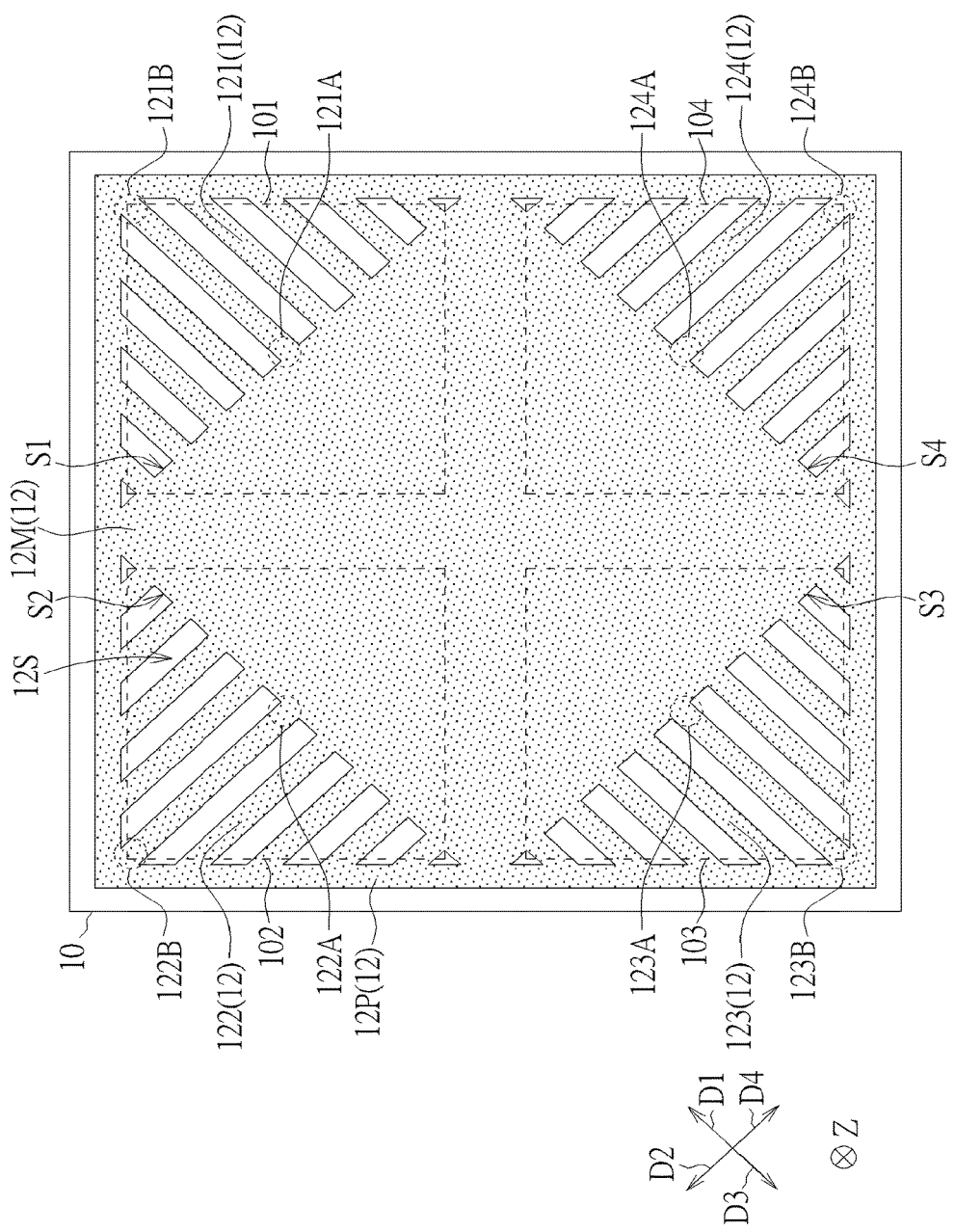
FIG. 16 is a top view schematically illustrating a first pixel electrode of a pixel structure of display panel according to a third embodiment of the present invention.
Figure 17:
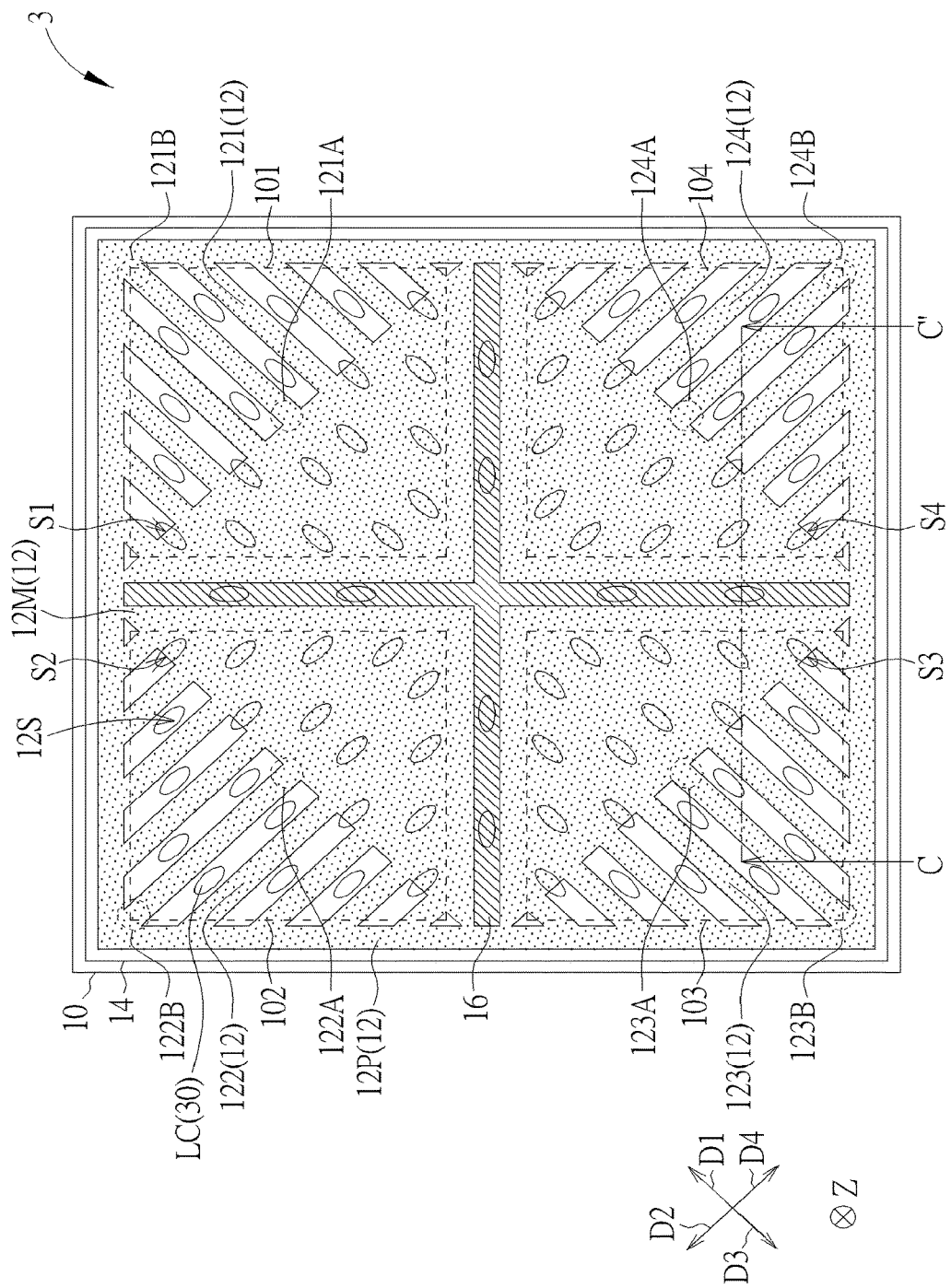
FIG. 17 is a top view schematically illustrating the pixel structure of display panel according to the third embodiment of the present invention.
Figure 18:
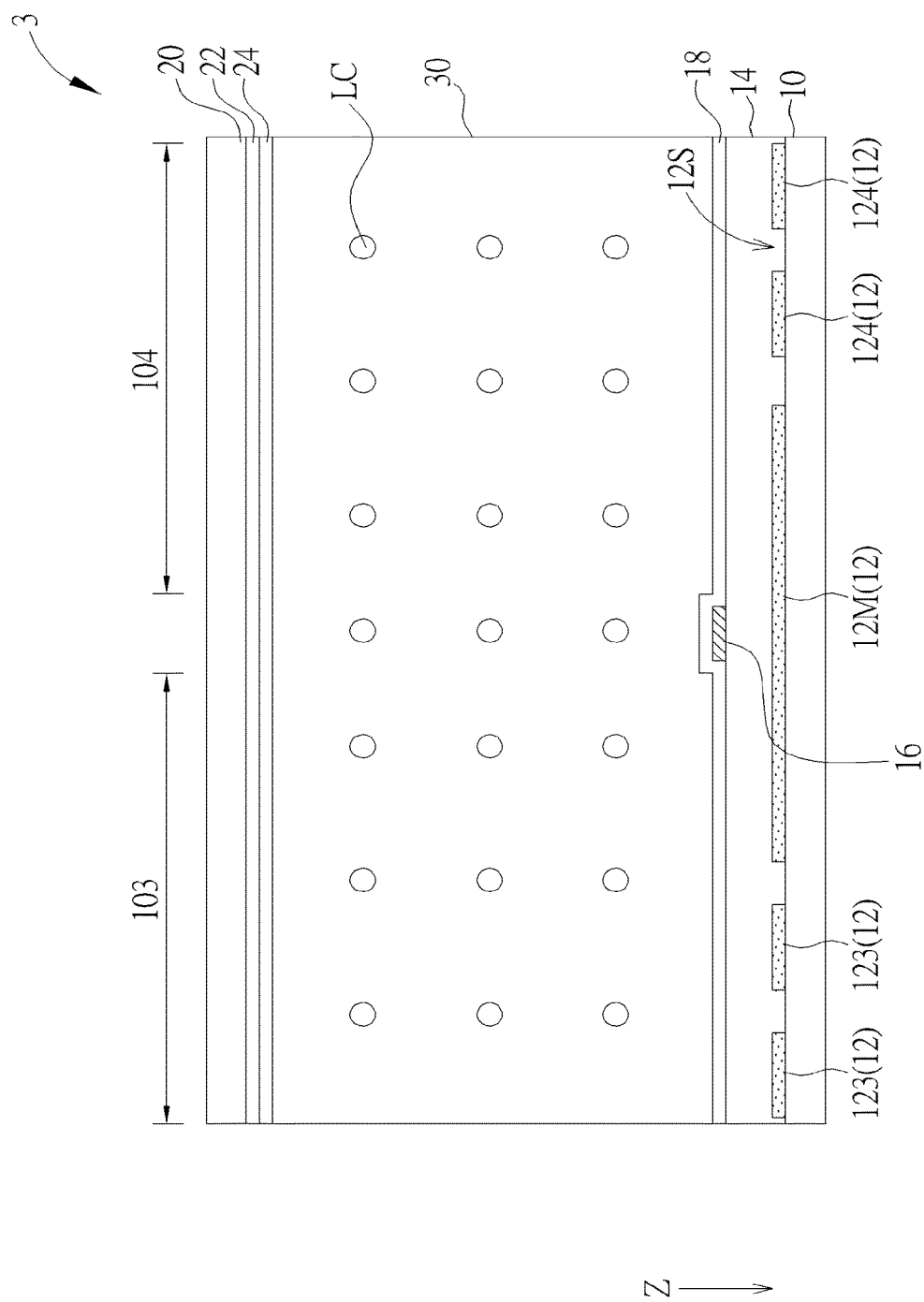
FIG. 18 is a cross-sectional view of the pixel structure of display panel taken along line C-C' of FIG. 17.

Please refer to FIGS. 16-18. FIG. 16 is a top view schematically illustrating a first pixel electrode of a pixel structure of display panel according to a third embodiment of the present invention. FIG. 17 is a top view schematically illustrating the pixel structure of display panel according to the third embodiment of the present invention. FIG. 18 is a cross-sectional view of the pixel structure of display panel taken along line C-C' of FIG. 17. As shown in FIGS. 16-18, the difference between the present embodiment and the embodiments mentioned above is that the main part 12M of the first pixel electrode 12 of the pixel structure 3 of display panel of the present embodiment is disposed in a portion of the first alignment region 101, a portion of the second alignment region 102, a portion of the third alignment region 103, a portion of the fourth alignment region 104 and a common boundary of any two adjoining (adjacent) alignment regions of the alignment regions. In addition, the main part 12M of the first pixel electrode 12 is connected to a first end 121A of each of the first branch electrodes 121, a first end 122A of each of the second branch electrodes 122, a first end 123A of each of the third branch electrodes 123 and a first end 124A of each of the fourth branch electrodes 124. The main part 12M of the first pixel electrode 12 substantially overlaps the second pixel electrode 16 in the vertical projection direction Z. For example, the main part 12M of the first pixel electrode 12 substantially includes a quadrangle electrode (or known as a diamond electrode or a rhombus electrode). The quadrangle electrode has a first side edge S1, a second side edge S2, a third side edge S3 and a fourth side edge S4. The first side edge S1 is disposed in the first alignment region 101 and is connected to the first branch electrodes 121, the second side edge S2 is disposed in the second alignment region 102 and is connected to the second branch electrodes 122, the third side edge S3 is disposed in the third alignment region 103 and is connected to the third branch electrodes 123, the fourth side edge S4 is disposed in the fourth alignment region 104 and is connected to the fourth branch electrodes 124, and the second pixel electrode 16 substantially includes a cruciform electrode, but not limited thereto. The first side edge S1, the second side edge S2, the third side edge S3 and the fourth side edge S4 may be but not limited to be perpendicular to the corresponding first branch electrodes 121, the second branch electrodes 122, the third branch electrodes 123 and the fourth branch electrodes 124. In an alternative embodiment, the first side edge S1, the second side edge S2, the third side edge S3 and the fourth side edge S4 are not perpendicular to the corresponding first branch electrodes 121, the second branch electrodes 122, the third branch electrodes 123 and the fourth branch electrodes 124, in other words, they may have included angles which not equal to 90 degrees.

Figure 19:
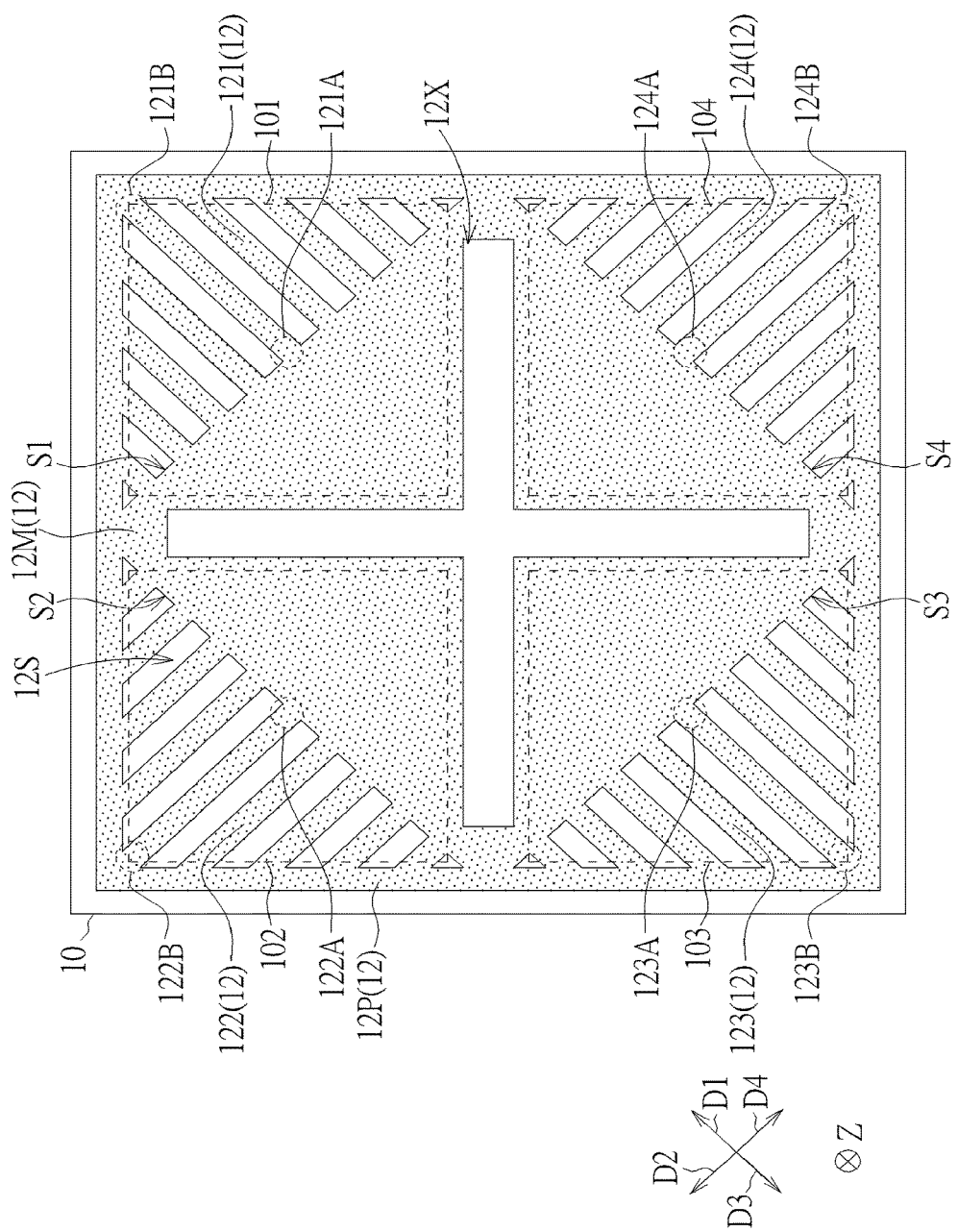
FIG. 19 is a top view schematically illustrating a first pixel electrode of a pixel structure of display panel according to a fourth embodiment of the present invention.
Figure 20:
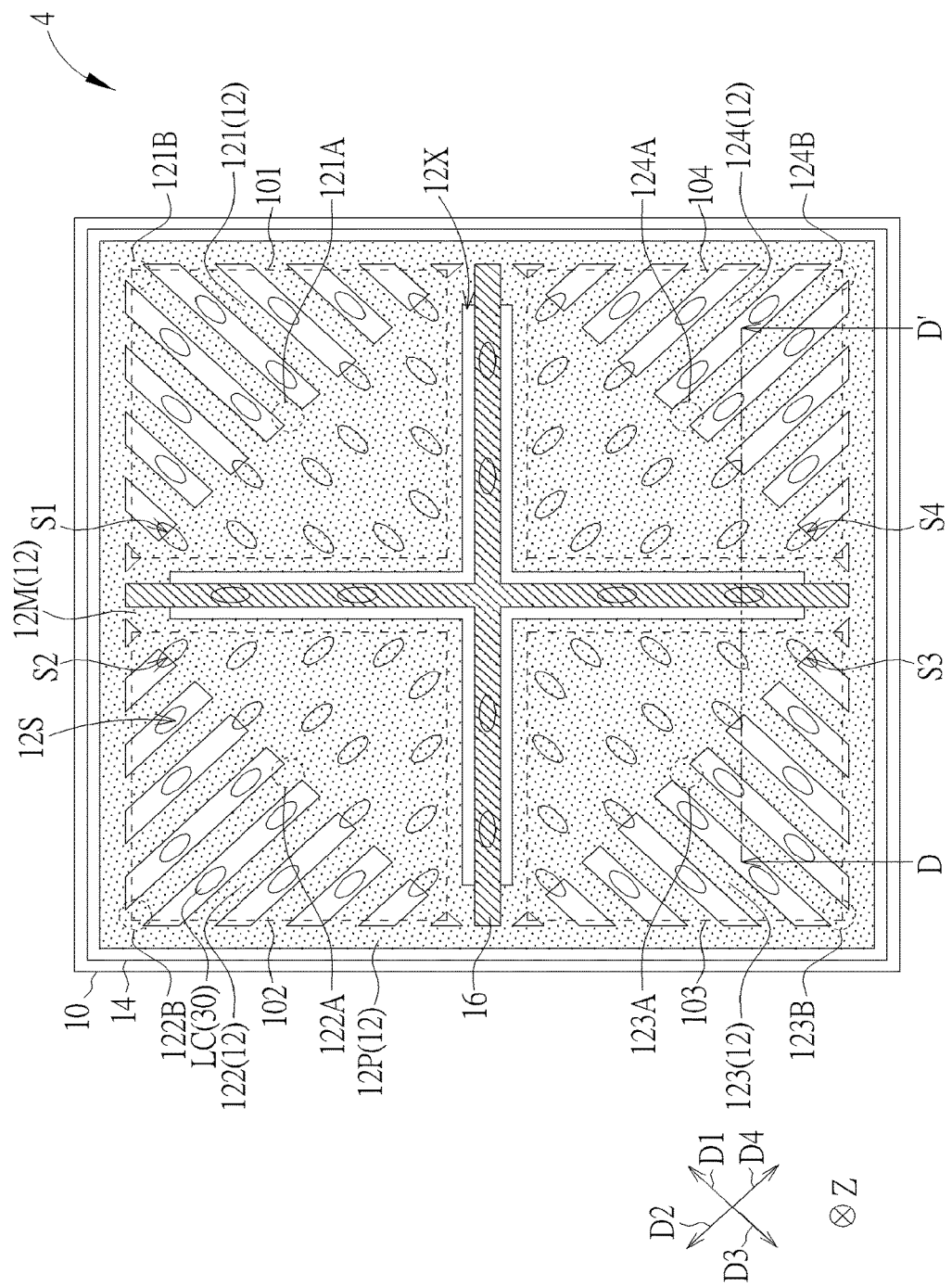
FIG. 20 is a top view schematically illustrating the pixel structure of display panel according to the fourth embodiment of the present invention.
Figure 21:
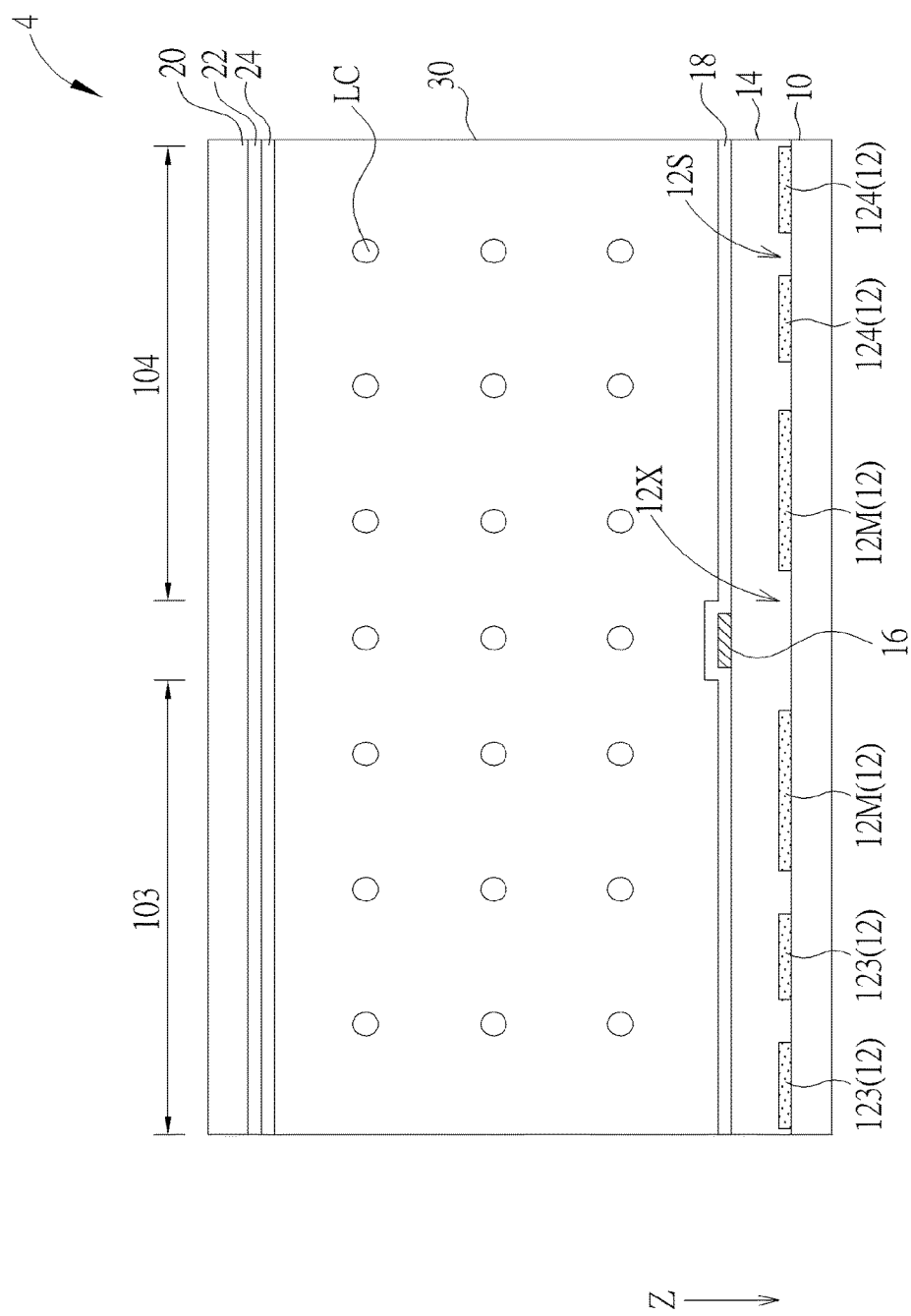
FIG. 21 is a cross-sectional view of the pixel structure of display panel taken along line D-D' of FIG. 20.

Please refer to FIGS. 19-21. FIG. 19 is a top view schematically illustrating a first pixel electrode of a pixel structure of display panel according to a fourth embodiment of the present invention. FIG. 20 is a top view schematically illustrating the pixel structure of display panel according to the fourth embodiment of the present invention. FIG. 21 is a cross-sectional view of the pixel structure of display panel taken along line D-D' of FIG. 20. As shown in FIGS. 19-21, the formation of the main part 12M of the first pixel electrode 12 and the connections between the branch electrodes of the pixel structure 4 of display panel of the present embodiment are similar to the third embodiment, the difference between the present embodiment and the third embodiment is that the main part 12M of the first pixel electrode 12 further has an opening 12X corresponding to the common boundaries of any two adjacent alignment regions. In other words, the opening 12X is disposed between the first alignment region 101 and the second alignment region 102, the second alignment region 102 and the third alignment region 103, the third alignment region 103 and the fourth alignment region 104, and the fourth alignment region 104 and the first alignment region 101. In addition, the opening 12X of the main part 12M of the first pixel electrode 12 substantially at least partially overlaps the second pixel electrode 16 in the vertical projection direction Z. For instance, the opening 12X of the main part 12M of the first pixel electrode 12 substantially includes a cruciform opening and the second pixel electrode 16 substantially includes a cruciform electrode. In addition, the width of the opening 12X of the main part 12M of the first pixel electrode 12 may be slightly larger than the width of the second pixel electrode 16, but not limited thereto.

Figure 22:
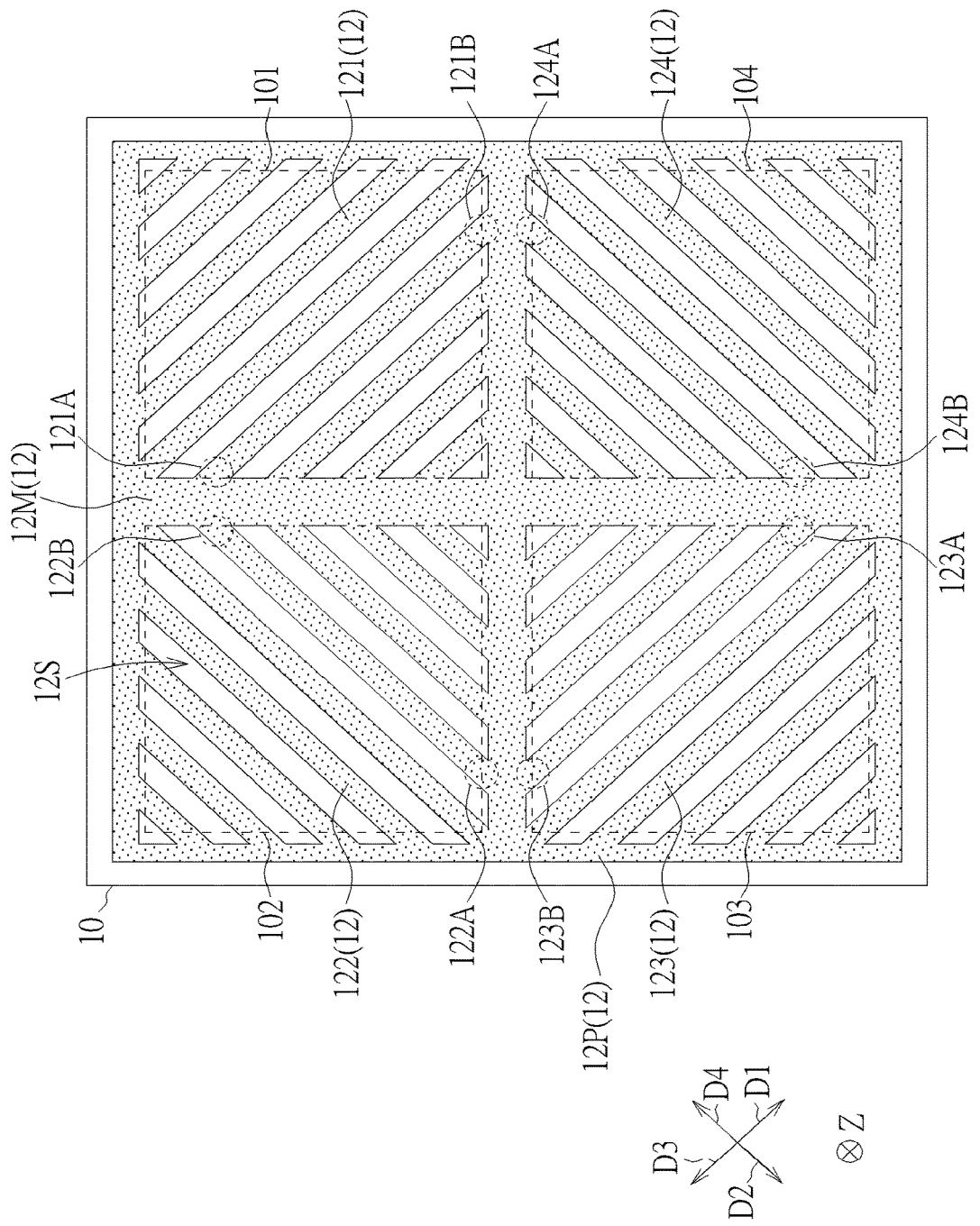
FIG. 22 is a top view schematically illustrating a first pixel electrode of a pixel structure of display panel according to a fifth embodiment of the present invention.
Figure 23:
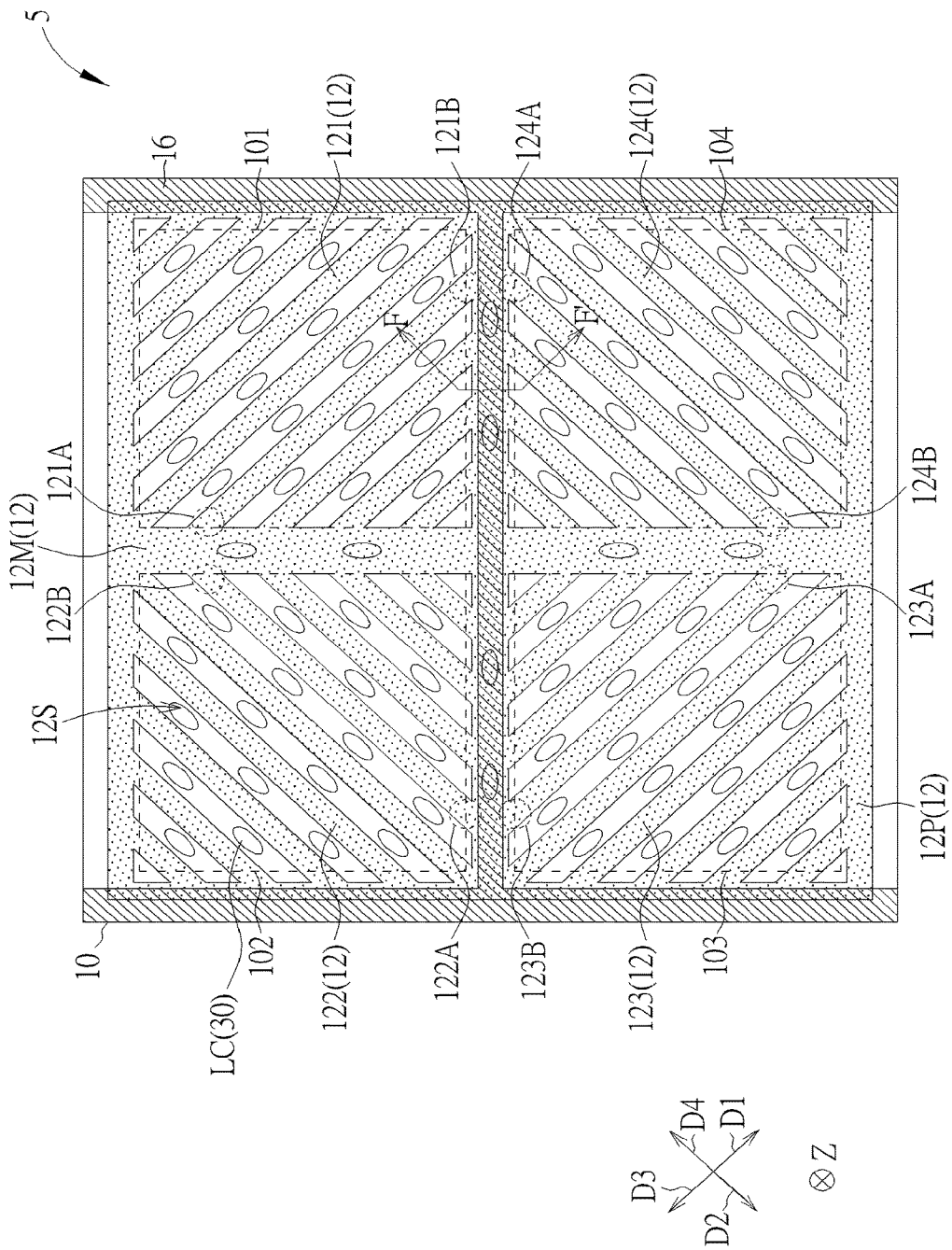
FIG. 23 is a top view schematically illustrating the pixel structure of display panel according to the fifth embodiment of the present invention.
Figure 24:
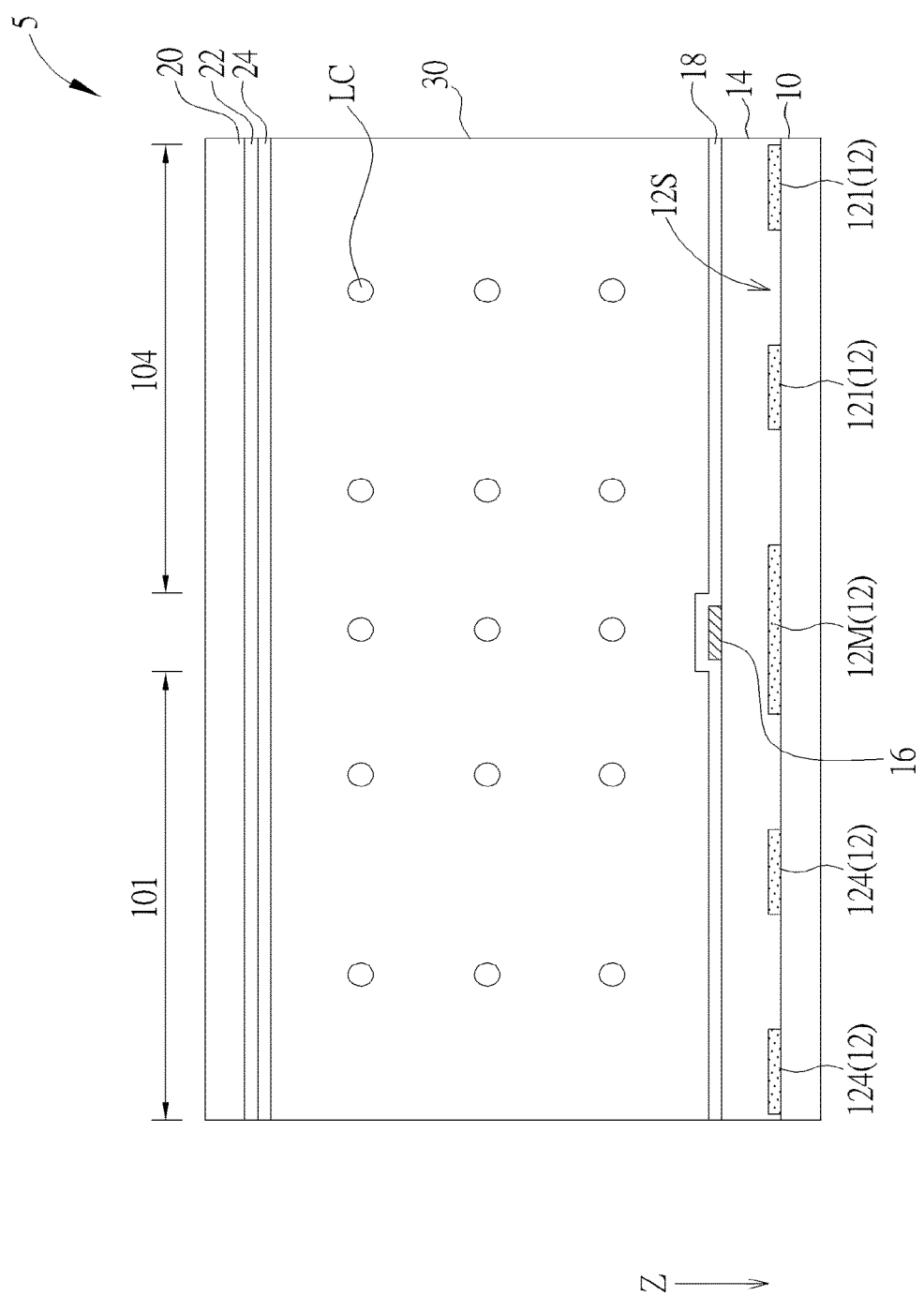
FIG. 24 is a cross-sectional view of the pixel structure of display panel taken along line F-F' of FIG. 23.

Please refer to FIGS. 22-24. FIG. 22 is a top view schematically illustrating a first pixel electrode of a pixel structure of display panel according to a fifth embodiment of the present invention. FIG. 23 is a top view schematically illustrating the pixel structure of display panel according to the fifth embodiment of the present invention. FIG. 24 is a cross-sectional view of the pixel structure of display panel taken along line F-F' of FIG. 23. As shown in FIGS. 22-24, in the pixel structure 5 of display panel of the fifth embodiment of the present invention, the main part 12M of the first pixel electrode 12 is disposed in the common boundaries of any two adjoining (adjacent) alignment regions of the alignment regions. In other words, the main part 12M is disposed between the first alignment region 101 and the second alignment region 102, the second alignment region 102 and the third alignment region 103, the third alignment region 103 and the fourth alignment region 104, and the fourth alignment region 104 and the first alignment region 101. In addition, the main part 12M of the first pixel electrode 12 is connected to the first end 121A and the second end 121B of a portion of each of the first branch electrodes 121, the first end 122A and the second end 122B of a portion of each of the second branch electrodes 122, the first end 123A and the second end 123B of a portion of each of the third branch electrodes 123 and the first end 124A and the second end 124B of a portion of each of the fourth branch electrodes 124. Furthermore, the outer frame part 12P is connected to the first end 121A and the second end 121B of the other portion of each of the first branch electrodes 121, the first end 122A and the second end 122B of the other portion of each of the second branch electrodes 122, the first end 123A and the second end 123B of the other portion of each of the third branch electrodes 123, and the first end 124A and the second end 124B of the other portion of each of the fourth branch electrodes 124. Additionally, the second pixel electrode 16 is disposed in an outside boundary of the first alignment region 101 (e.g. the right side boundary in the figure), an outside boundary of the second alignment region 102 (e.g. the left side boundary in the figure), an outside boundary of the third alignment region 103 (e.g. the left side boundary in the figure), an outside boundary of the fourth alignment region 104 (e.g. the right side boundary in the figure), a common boundary of the first alignment region 101 and the fourth alignment region 104 and a common boundary of the second alignment region 102 and the third alignment region 103. For instance, in the present embodiment, the main part 12M of the first pixel electrode 12 substantially includes a cruciform electrode and the second pixel electrode 16 substantially includes an H-shaped electrode, but not limited thereto.

When the liquid crystal molecules LC are driven by the electric field between the first pixel electrode 12 and the common electrode 22 and the electric field between the second pixel electrode 16 and the common electrode 22, the liquid crystal molecules LC located at the first alignment region 101, the second alignment region 102, the third alignment region 103 and the fourth alignment region 104 would tilt and have different alignment direction. For instance, the liquid crystal molecules LC located at the first alignment region 101, the second alignment region 102, the third alignment region 103 and the fourth alignment region 104 would respectively tilt toward the first direction D1, the second direction D2, the third direction D3 and the fourth direction D4 respectively. Specifically, the liquid crystal molecules LC located at the first alignment region 101 and the fourth alignment region 104 tilt toward the right side T-junction of the H-shaped second pixel electrode 16, and the liquid crystal molecules LC located at the second alignment region 102 and the third alignment region 103 tilt toward the left side T-junction of the H-shaped second pixel electrode 16.

Figure 25:
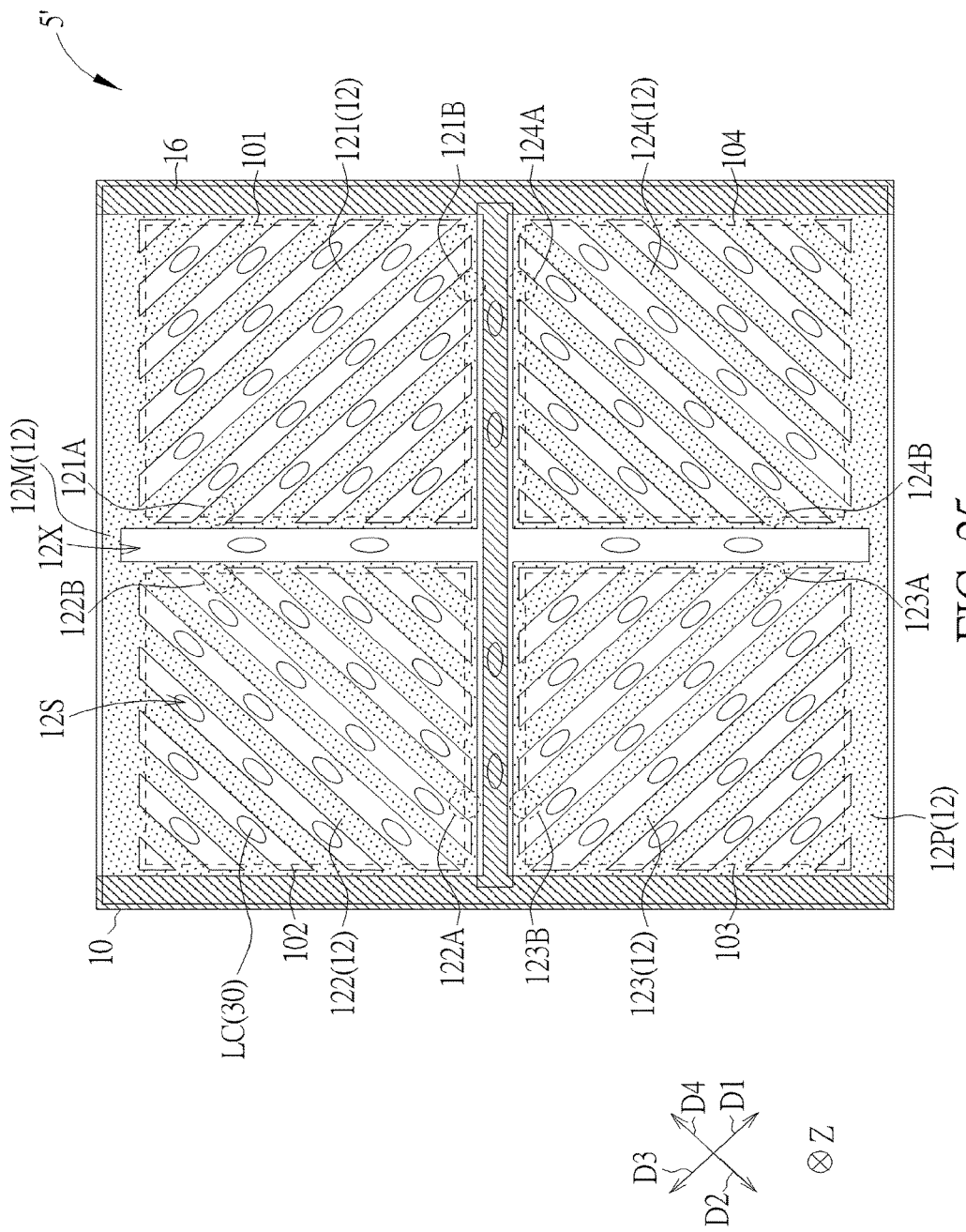
FIG. 25 is a top view schematically illustrating the pixel structure of display panel according to an alternative embodiment of the fifth embodiment of the present invention.

Please refer to FIG. 25. FIG. 25 is a top view schematically illustrating the pixel structure of display panel according to an alternative embodiment of the fifth embodiment of the present invention. As shown in FIG. 25, the formation of the main part 12M of the first pixel electrode 12 and the connections between the branch electrodes of the pixel structure 5' of display panel of the present embodiment are similar to the fifth embodiment, the difference between the present embodiment and the fifth embodiment is that the main part 12M of the first pixel electrode 12 further has an opening 12X corresponding to the common boundaries of any two adjacent alignment regions. In other words, the opening 12X is disposed between the first alignment region 101 and the second alignment region 102, the second alignment region 102 and the third alignment region 103, the third alignment region 103 and the fourth alignment region 104, and the fourth alignment region 104 and the first alignment region 101. In addition, the opening 12X of the main part 12M of the first pixel electrode 12 substantially at least partially overlaps the second pixel electrode 16 in the vertical projection direction Z. For instance, the opening 12X of the main part 12M of the first pixel electrode 12 substantially includes a cruciform opening and the second pixel electrode 16 substantially includes an H-shaped electrode. In addition, the width of the opening 12X of the main part 12M of the first pixel electrode 12 may be slightly larger than the width of the second pixel electrode 16, but not limited thereto.

Figure 26:
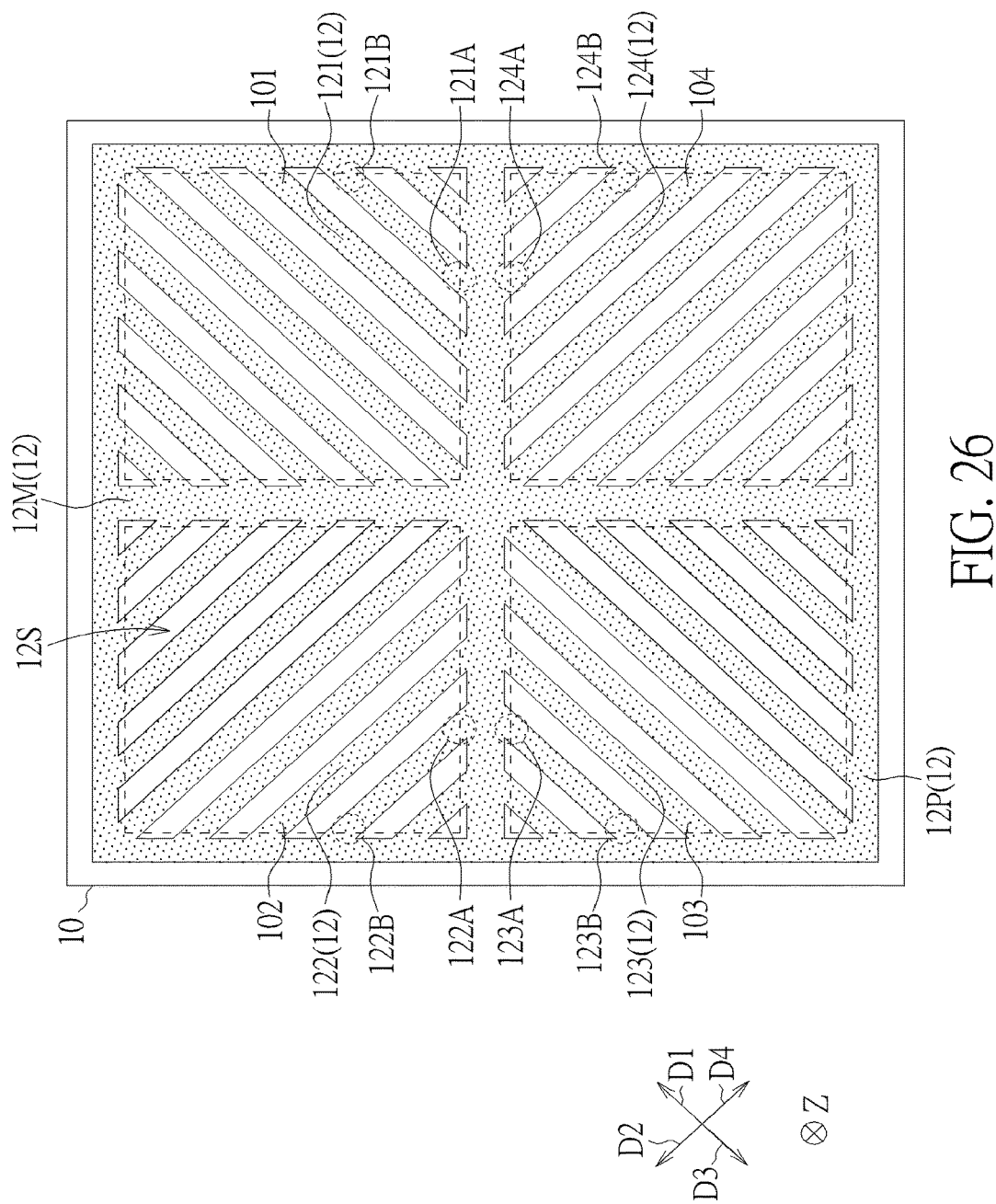
FIG. 26 is a top view schematically illustrating a first pixel electrode of a pixel structure of display panel according to a sixth embodiment of the present invention.
Figure 27:
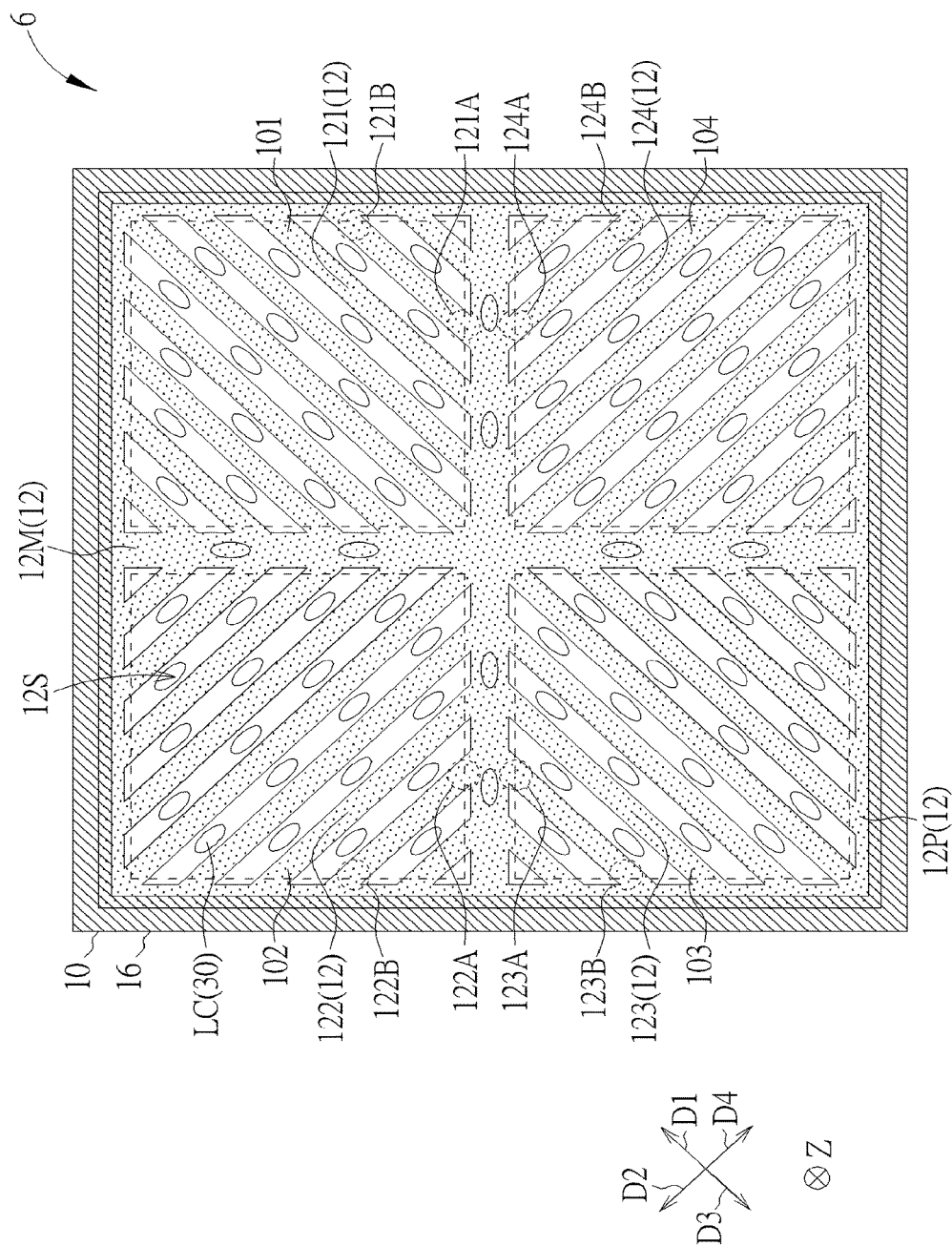
FIG. 27 is a top view schematically illustrating the pixel structure of display panel according to the sixth embodiment of the present invention.

Please refer to FIGS. 26-27. FIG. 26 is a top view schematically illustrating a first pixel electrode of a pixel structure of display panel according to a sixth embodiment of the present invention. FIG. 27 is a top view schematically illustrating the pixel structure of display panel according to the sixth embodiment of the present invention. As shown in FIGS. 26-27, the shape of the first pixel electrode 12 in the pixel structure 6 of display panel of the present embodiment is similar to the shape of the first pixel electrode 12 in the first embodiment and the arrangement of the main part 12M, the outer frame part 12P and the branch electrodes will not be redundantly described. The difference between the first embodiment and the present embodiment is that the second pixel electrode 16 is disposed in two outside boundaries of the first alignment region 101 (e.g. the right side boundary and the upper side boundary in the figure), two outside boundaries of the second alignment region 102 (e.g. the left side boundary and the upper side boundary in the figure), two outside boundaries of the third alignment region 103 (e.g. the left side boundary and the lower side boundary in the figure) and two outside boundaries of the fourth alignment region 104 (e.g. the right side boundary and the lower side boundary in the figure). More specifically, the second pixel electrode 16 substantially includes a hollow square shaped electrode and surrounds the first alignment region 101, the second alignment region 102, the third alignment region 103 and the fourth alignment region 104.

Figure 28:
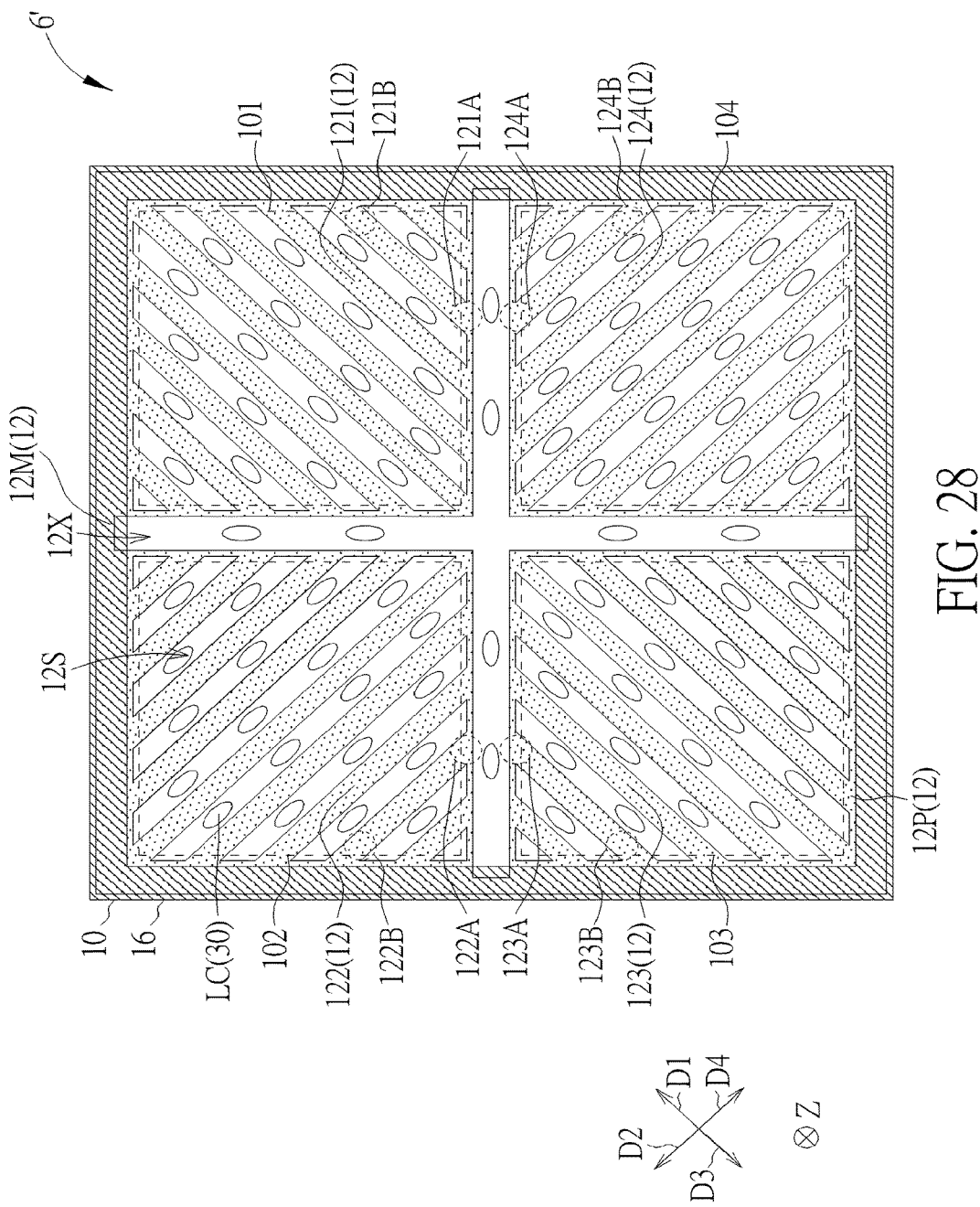
FIG. 28 is a top view schematically illustrating the pixel structure of display panel according to an alternative embodiment of the sixth embodiment of the present invention.

Please refer to FIG. 28. FIG. 28 is a top view schematically illustrating the pixel structure of display panel according to an alternative embodiment of the sixth embodiment of the present invention. As shown in FIG. 28, the formation of the main part 12M of the first pixel electrode 12 and the connections between the branch electrodes of the pixel structure 6' of display panel of the present embodiment are similar to the sixth embodiment, the difference between the present embodiment and the sixth embodiment is that the main part 12M of the first pixel electrode 12 further has an opening 12X corresponding to the common boundaries of any two adjacent alignment regions. In other words, the opening 12X is disposed between the first alignment region 101 and the second alignment region 102, the second alignment region 102 and the third alignment region 103, the third alignment region 103 and the fourth alignment region 104, and the fourth alignment region 104 and the first alignment region 101. In addition, the opening 12X of the main part 12M of the first pixel electrode 12 substantially partially overlaps the second pixel electrode 16 in the vertical projection direction Z. For instance, the opening 12X of the main part 12M of the first pixel electrode 12 substantially includes a cruciform opening and the second pixel electrode 16 substantially includes a hollow square shaped electrode, but not limited thereto.

Figure 29:
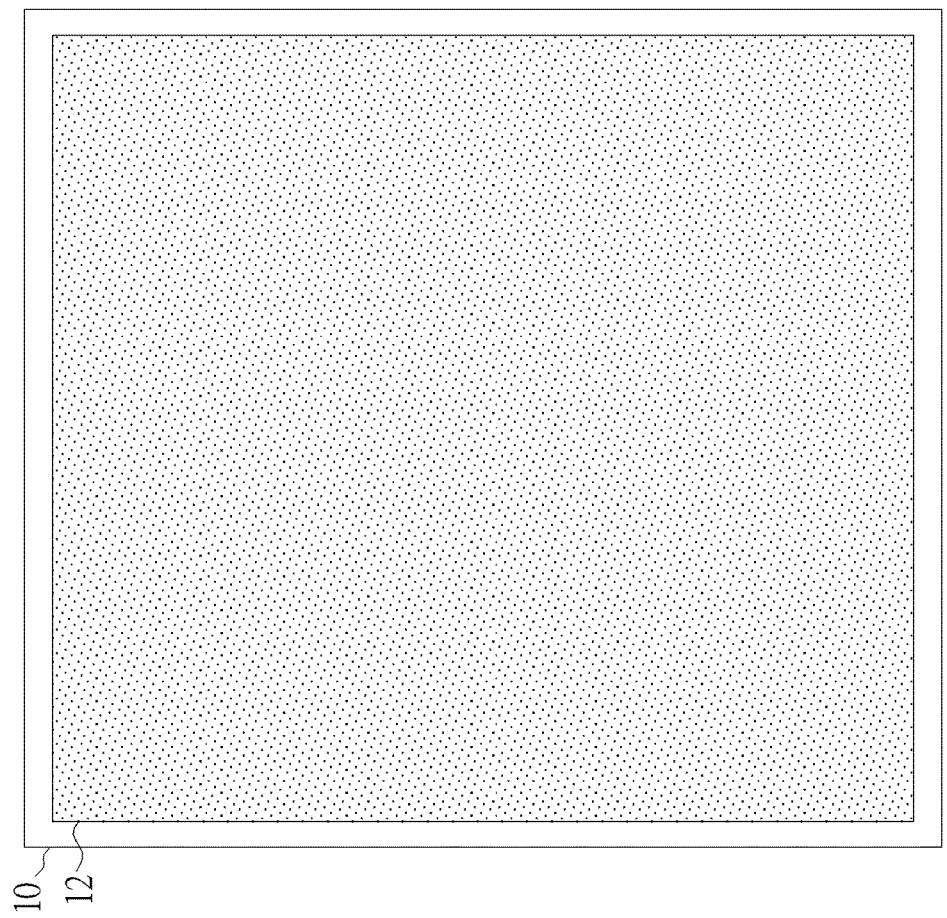
FIG. 29 is a top view schematically illustrating a first pixel electrode of a pixel structure of display panel according to a seventh embodiment of the present invention.
Figure 30:
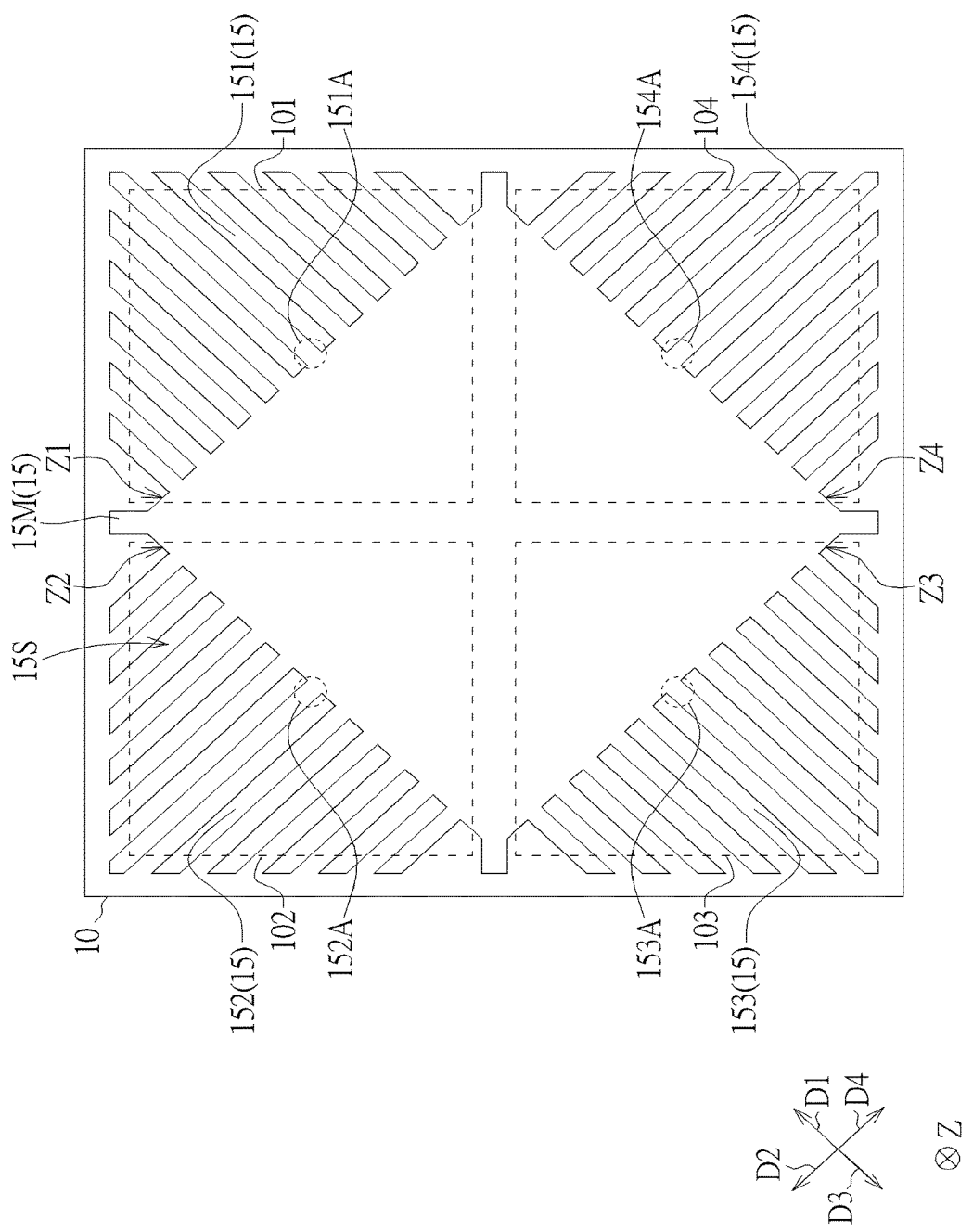
FIG. 30 is a top view schematically illustrating a patterned insulation layer of the pixel structure of display panel according to the seventh embodiment of the present invention.
Figure 31:
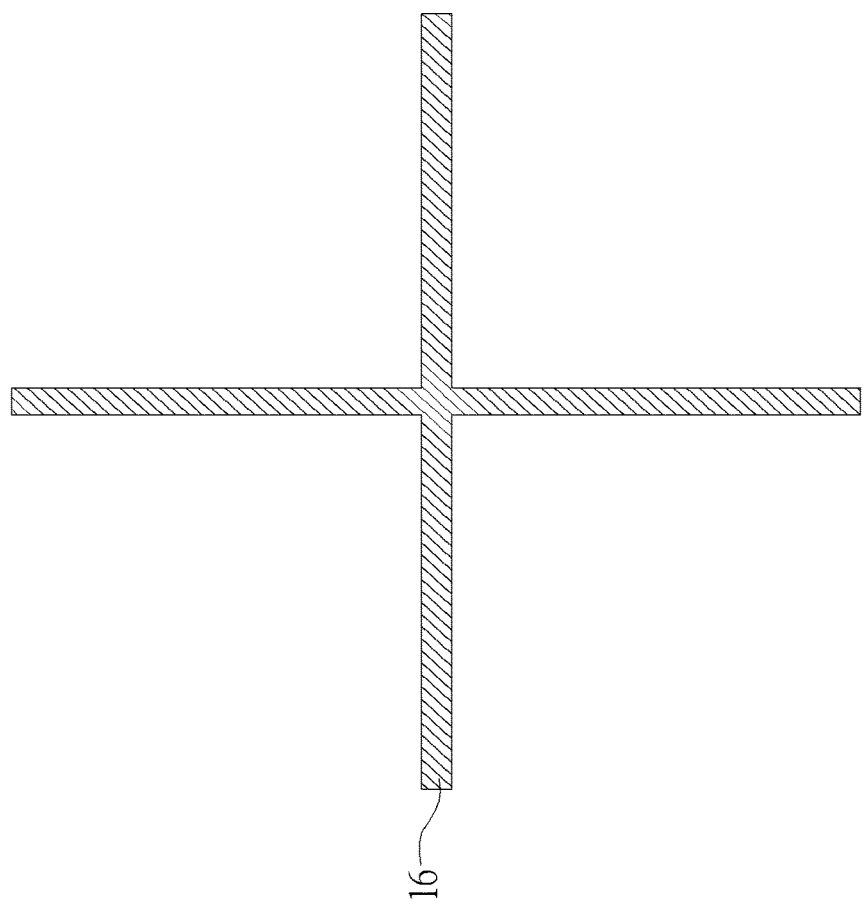
FIG. 31 is a top view schematically illustrating a second pixel electrode of the pixel structure of display panel according to the seventh embodiment of the present invention.
Figure 32:
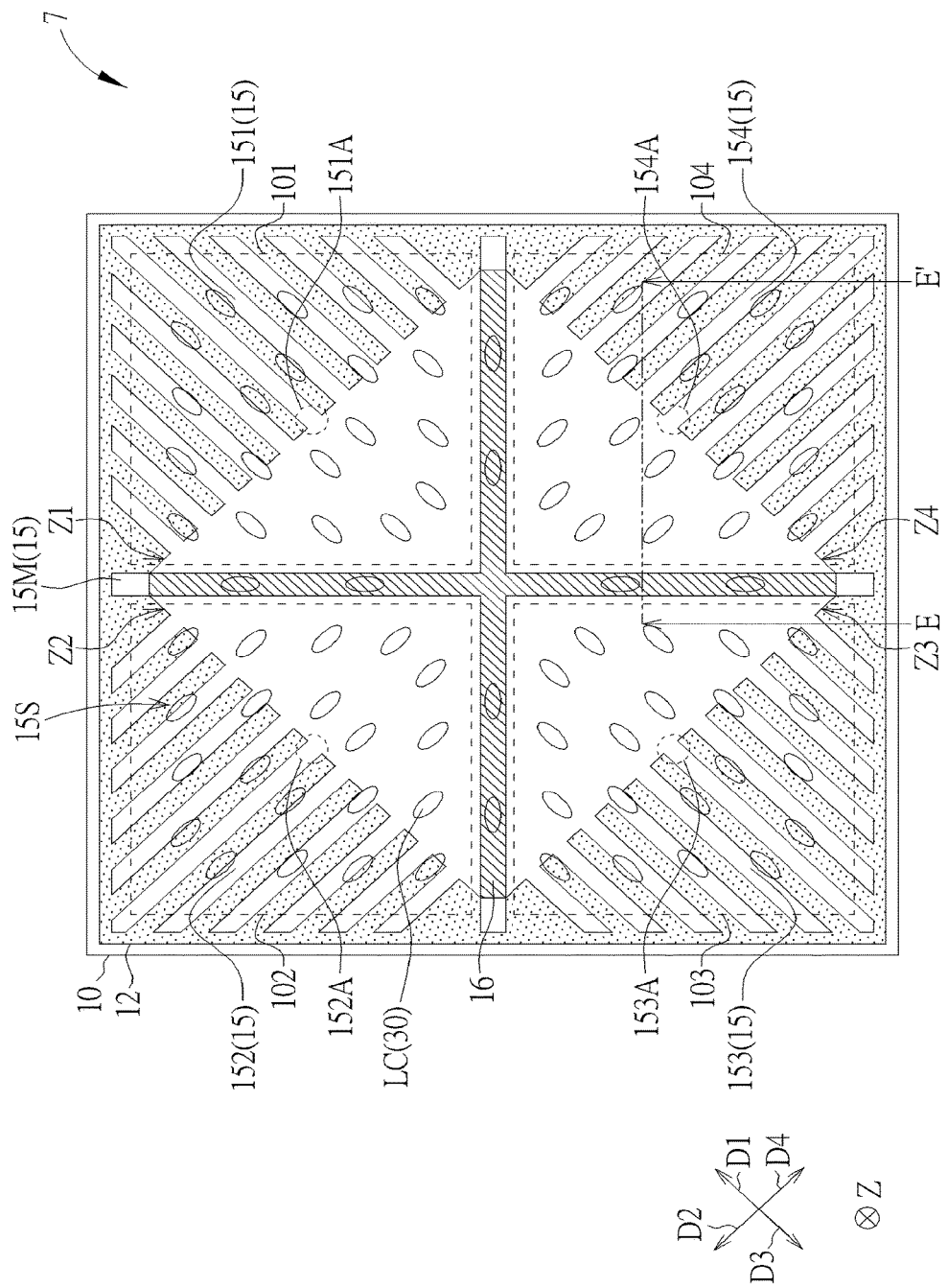
FIG. 32 is a top view schematically illustrating the pixel structure of display panel according to the seventh embodiment of the present invention.
Figure 33:
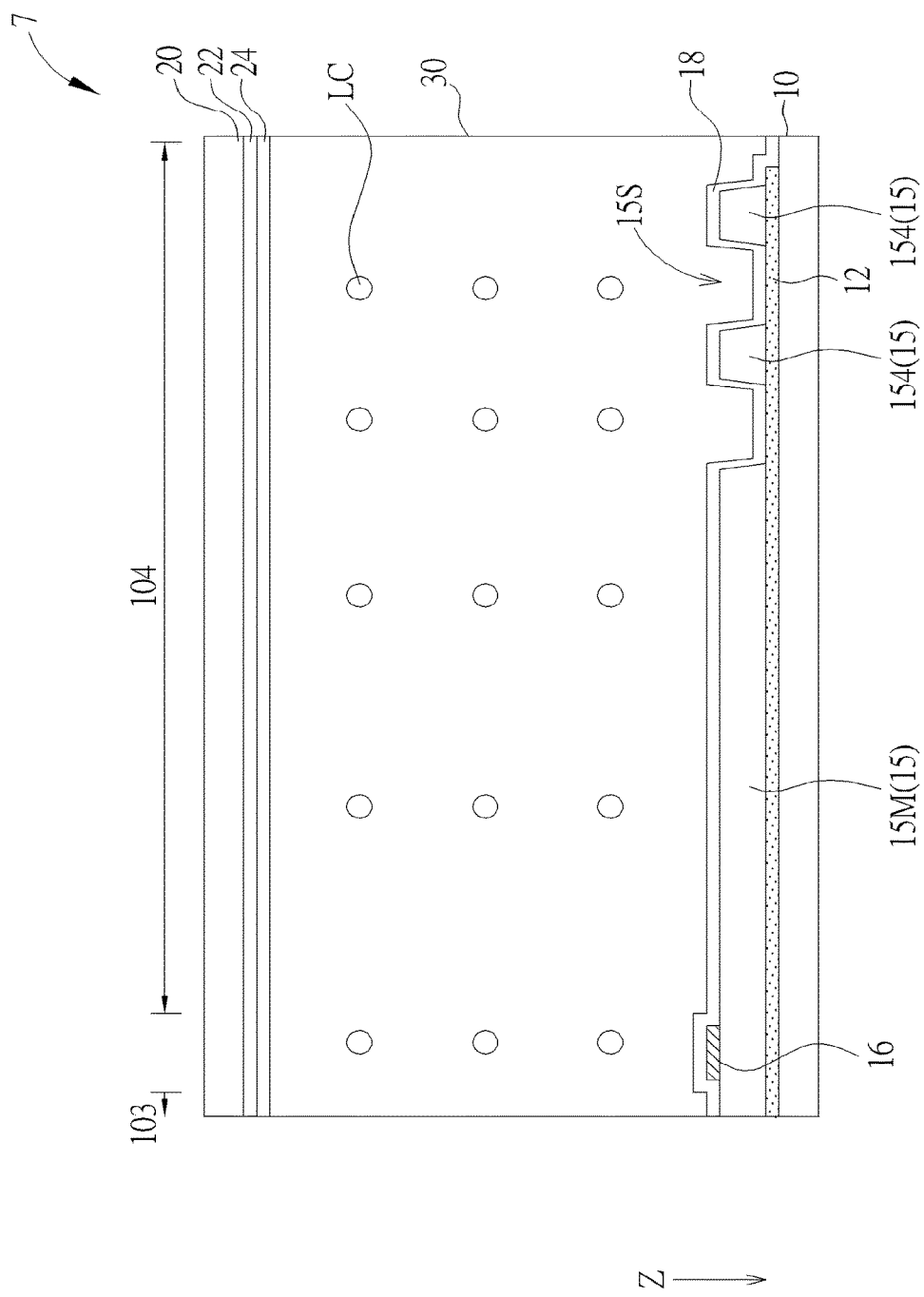
FIG. 33 is a cross-sectional view of the pixel structure of display panel taken along line E-E' of FIG. 32.

Please refer to FIGS. 29-33. FIG. 29 is a top view schematically illustrating a first pixel electrode of a pixel structure of display panel according to a seventh embodiment of the present invention. FIG. 30 is a top view schematically illustrating a patterned insulation layer of the pixel structure of display panel according to the seventh embodiment of the present invention. FIG. 31 is a top view schematically illustrating a second pixel electrode of the pixel structure of display panel according to the seventh embodiment of the present invention. FIG. 32 is a top view schematically illustrating the pixel structure of display panel according to the seventh embodiment of the present invention. FIG. 33 is a cross-sectional view of the pixel structure of display panel taken along line E-E' of FIG. 32. As shown in FIG. 29, FIG. 32 and FIG. 33, the difference between the pixel structure 7 of display panel of the present embodiment and the first embodiment to the sixth embodiment mentioned above is that the first pixel electrode 12 is substantially a full-surfaced electrode which completely covers the first alignment region 101, the second alignment region 102, the third alignment region 103 and the fourth alignment region 104 without any slits or openings. In addition, the insulation layer of the present invention is a patterned insulation layer 15 as shown in FIG. 30, FIG. 32 and FIG. 33, not a full-surfaced insulation layer. The patterned insulation layer 15 is disposed on the first substrate 10 and partially covers the first pixel electrode 12, wherein the patterned insulation layer 15 includes a plurality of insulation branch patterns. The insulation branch patterns includes a plurality of first insulation branch patterns 151, a plurality of second insulation branch patterns 152, a plurality of third insulation branch patterns 153 and a plurality of fourth insulation branch patterns 154. The first insulation branch patterns 151 are disposed in the first alignment region 101 and at least a portion of the first branch patterns 151 substantially extends along a first direction D1. The second insulation branch patterns 152 are disposed in the second alignment region 102 and at least a portion of the second branch patterns 152 substantially extends along a second direction D2. The third insulation branch patterns 153 are disposed in the third alignment region 103 and at least a portion of the third branch patterns 153 substantially extends along a third direction D3. The fourth insulation branch patterns 154 are disposed in the fourth alignment region 104 and at least a portion of the fourth branch patterns 154 substantially extends along a fourth direction D4. The first direction D1, the second direction D2, the third direction D3 and the fourth direction D4 are different to one another. In addition, a slit 15S is disposed between any two adjacent insulation branch patterns. The second pixel electrode 16 of the present embodiment may be the same as the second pixel electrode 16 of the embodiments mentioned above, for example, the second pixel electrode 16 substantially includes a cruciform electrode, but not limited thereto. Furthermore, the patterned insulation layer 15 of the present embodiment may further include an insulation main part 15M disposed in a portion of the first alignment region 101, a portion of the second alignment region 102, a portion of the third alignment region 103, a portion of the fourth alignment region 104 and a common boundary of any two adjoining alignment regions of the alignment regions. The insulation main part 15M is connected to an end 151A of each of the first branch patterns 151, an end 152A of each of the second branch patterns 152, an end 153A of each of the third branch patterns 153 and an end 154A of each of the fourth branch patterns 154. The second pixel electrode 16 substantially overlaps the insulation main part 15M of the patterned insulation layer 15 in the vertical projection direction Z. For instance, the insulation main part 15M of the patterned insulation layer 15 has a quadrangle insulation pattern, the quadrangle insulation pattern has a first side edge Z1, a second side edge Z2, a third side edge Z3 and a fourth side edge Z4. The first side edge Z1 is disposed in the first alignment region 101 and is connected to the first insulation branch patterns 151. The second side edge Z2 is disposed in the second alignment region 102 and is connected to the second insulation branch patterns 152. The third side edge Z3 is disposed in the third alignment region 103 and is connected to the third insulation branch patterns 153. The fourth side edge Z4 is disposed in the fourth alignment region 104 and is connected to the fourth insulation branch patterns 154. The first side edge Z1, the second side edge Z2, the third side edge Z3 and the fourth side edge Z4 may be but not limited to be perpendicular to the first direction D1, the second direction D2, the third direction D3 and the fourth direction D4, respectively. In addition, the first alignment film 18 is disposed on the first substrate 10 and covers the second pixel electrode 16, the patterned insulation layer 15 and the first pixel electrodes 12. The second alignment film 24 is disposed on the second substrate 20 and covers the common electrode 22.

The driving method of the pixel structure of display panel according to the second to the seventh embodiment of the present invention is the same as the driving method of the pixel structure of display panel according to the first embodiment and will not be redundantly described.

Figure 34:
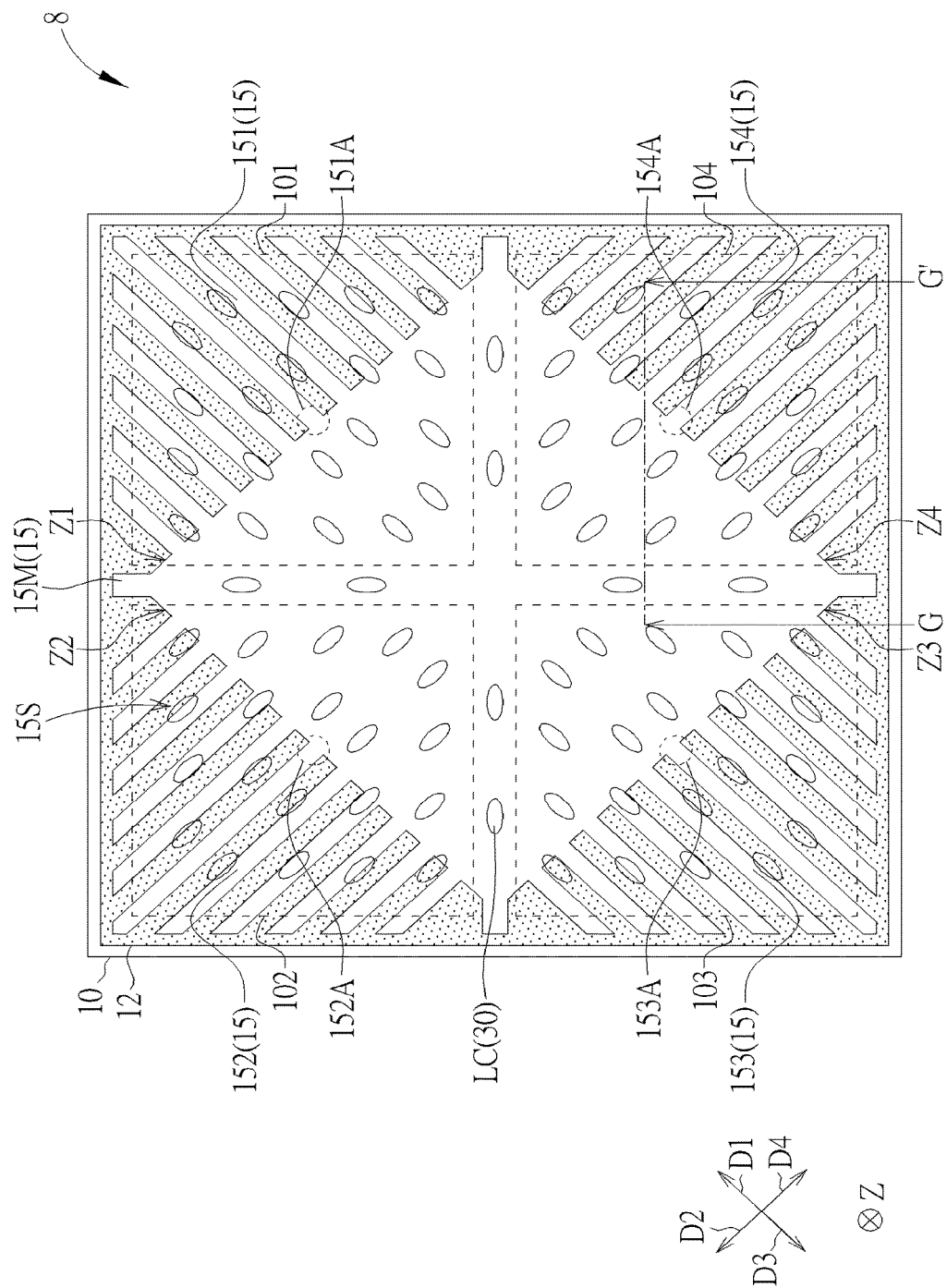
FIG. 34 is a top view schematically illustrating a pixel structure of display panel according to an eighth embodiment of the present invention.
Figure 35:
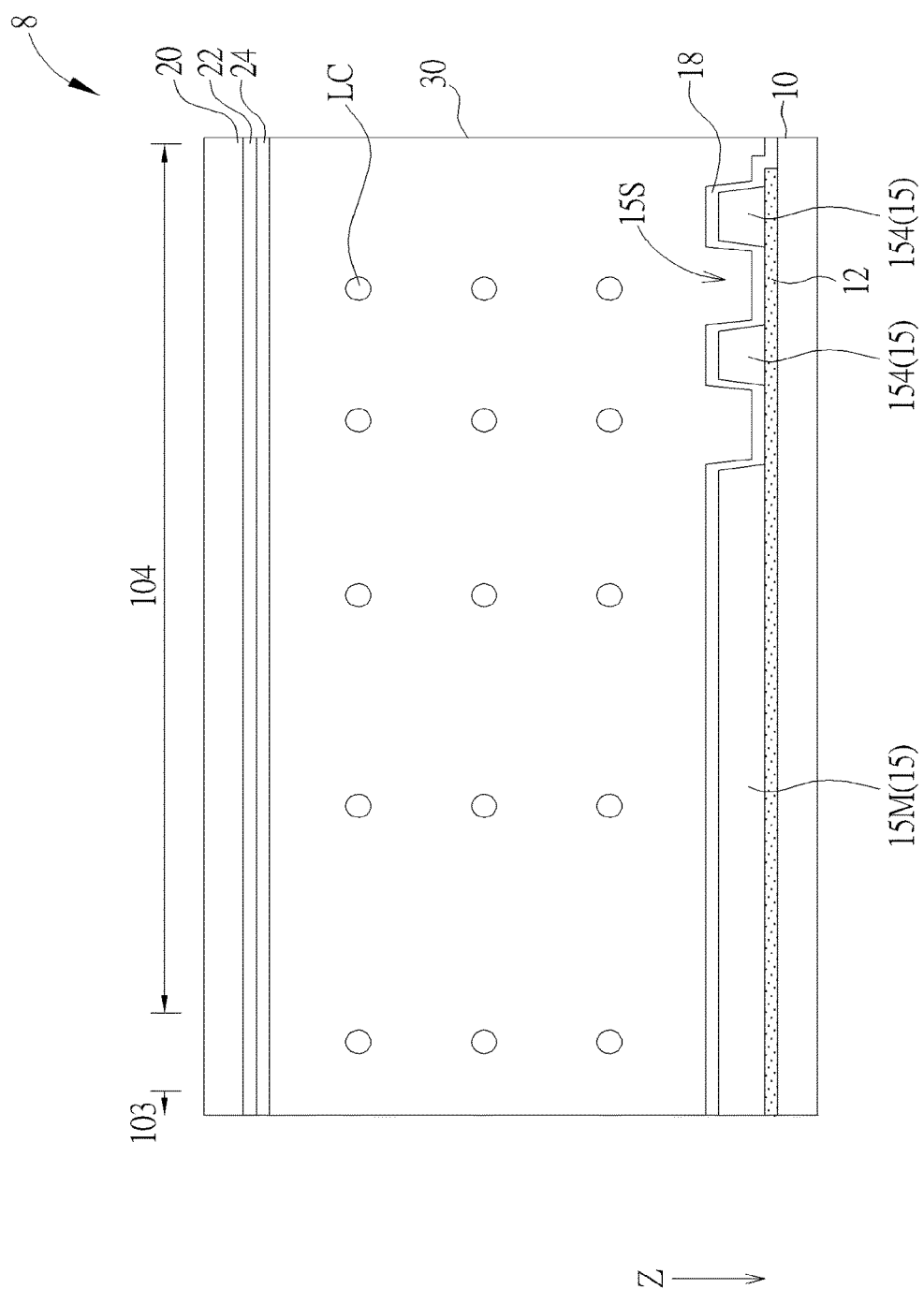
FIG. 35 is a cross-sectional view of the pixel structure of display panel taken along line G-G' of FIG. 34.

Please refer to FIGS. 34-35. FIG. 34 is a top view schematically illustrating a pixel structure of display panel according to an eighth embodiment of the present invention. FIG. 35 is a cross-sectional view of the pixel structure of display panel taken along line G-G' of FIG. 34. As shown in FIGS. 34-35, the pixel structure 8 of display panel according to the present embodiment is similar to the pixel structure 7 of display panel according to the seventh embodiment. The difference between the present embodiment and the seventh embodiment is that the pixel structure 8 of display panel of the present embodiment does not include a second pixel electrode. Without the second pixel electrode, the first alignment film 18 is disposed on the first substrate 10 and covers the patterned insulation layer 15 and the first pixel electrodes 12. The second alignment film 24 is disposed on the second substrate 20 and covers the common electrode 22. The pixel structure 8 of display panel is able to reduce the width of the dark line in the proximity of the slits 15S in the first alignment region 101, the second alignment region 102, the third alignment region 103 and the fourth alignment region 104, and thus increase the transmittance.

In conclusion, an insulation layer is disposed between the first pixel electrode and the liquid crystal layer in the pixel structure of display panel of the present invention so as to reduce the electric field distortions due to the fringe field effect of the edge of the main part of the first pixel electrode and the edge of the branch electrodes. By substituting the fringe field with the equipotential surface variations provided by the second pixel electrode, the irregular arrangement of the liquid crystal molecules can be eliminated, the generation of dark lines is avoided and therefore the transmittance is increased Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel structure of display panel, comprising:
    a first substrate, the first substrate having a plurality of alignment regions, the alignment regions comprising a first alignment region, a second alignment region, a third alignment region and a fourth alignment region;
    a second substrate, disposed opposite to the first substrate;
    a liquid crystal layer, comprising a plurality of liquid crystal molecules, wherein the liquid crystal molecules are disposed between the first substrate and the second substrate, and the liquid crystal molecules located at the first alignment region, the second alignment region, the third alignment region and the fourth alignment region have different alignment directions;
    a first pixel electrode, disposed on the first substrate, wherein the first pixel electrode is a full-surfaced electrode and is disposed in the first alignment region, the second alignment region, the third alignment region and the fourth alignment region;
    a patterned insulation layer, disposed on the first substrate and covering the first pixel electrode, wherein the patterned insulation layer comprises:
        a plurality of first insulation branch patterns, disposed in the first alignment region, wherein at least a portion of the first insulation branch patterns substantially extends to a first direction;
        a plurality of second insulation branch patterns, disposed in the second alignment region, wherein at least a portion of the second insulation branch patterns substantially extends to a second direction;
        a plurality of third insulation branch patterns, disposed in the third alignment region, wherein at least a portion of the third insulation branch patterns substantially extends to a third direction;
        a plurality of fourth insulation branch patterns, disposed in the fourth alignment region, wherein at least a portion of the fourth insulation branch patterns substantially extends to a fourth direction, and the first direction, the second direction, the third direction and the fourth direction are different to one another; and
        an insulation main part, disposed in a portion of the first alignment region, a portion of the second alignment region, a portion of the third alignment region, a portion of the fourth alignment region and a common boundary of any two adjoining alignment regions of the alignment regions, wherein the insulation main part is connected to an end of each of the first insulation branch patterns, an end of each of the second insulation branch patterns, an end of each of the third insulation branch patterns and an end of each of the fourth insulation branch patterns;
    a second pixel electrode, disposed on the patterned insulation layer, wherein the second pixel electrode is disposed in the common boundary of any two adjoining alignment regions of the alignment regions, and the second pixel electrode substantially overlaps the insulation main part of the patterned insulation layer in a vertical projection direction; and
    a common electrode, disposed on the second substrate.

2. The pixel structure of display panel of claim 1, wherein the insulation main part has a quadrangle insulation pattern, the quadrangle insulation pattern includes a first side edge, a second side edge, a third side edge and a fourth side edge, the first side edge is disposed in the first alignment region and is connected to the first insulation branch patterns, the second side edge is disposed in the second alignment region and is connected to the second insulation branch patterns, the third side edge is disposed in the third alignment region and is connected to the third insulation branch patterns, and the fourth side edge is disposed in the fourth alignment region and is connected to the fourth insulation branch patterns.

3. The pixel structure of display panel of claim 1, wherein the first pixel electrode is electrically connected to the second pixel electrode.

4. The pixel structure of display panel of claim 1, further comprising:
    a first alignment film, disposed on the first substrate and covering the patterned insulation layer and the second pixel electrode, wherein the first alignment film has a first polymer auxiliary alignment layer; and
    a second alignment film, disposed on the second substrate and covering the common electrode, wherein the second alignment film has a second polymer auxiliary alignment layer.

5. The pixel structure of display panel of claim 1, wherein the first pixel electrode is not connected to the second pixel electrode, the first pixel electrode has a first driving voltage, the second pixel electrode has a second driving voltage,
wherein the second driving voltage is higher than the first
driving voltage.

\* \* \* \* \*